United States Patent
Cha et al.

(10) Patent No.: US 9,237,142 B2
(45) Date of Patent: Jan. 12, 2016

(54) CLIENT AND SERVER GROUP SSO WITH LOCAL OPENID

(75) Inventors: Inhyok Cha, Seoul (KR); Andreas Schmidt, Frankfurt am Main (DE); Andreas Leicher, Frankfurt (DE)

(73) Assignee: InterDigital Patent Holdings, Inc., Wilmington, DE (US)

( * ) Notice: Subject to any disclaimer, the term of this patent is extended or adjusted under 35 U.S.C. 154(b) by 27 days.

(21) Appl. No.: 13/978,219

(22) PCT Filed: Jan. 6, 2012

(86) PCT No.: PCT/US2012/020496
§ 371 (c)(1),
(2), (4) Date: Dec. 17, 2013

(87) PCT Pub. No.: WO2012/094602
PCT Pub. Date: Jul. 12, 2012

(65) Prior Publication Data
US 2014/0230027 A1 Aug. 14, 2014

Related U.S. Application Data

(60) Provisional application No. 61/430,869, filed on Jan. 7, 2011.

(51) Int. Cl.
*H04L 29/06* (2006.01)
(52) U.S. Cl.
CPC ............ *H04L 63/08* (2013.01); *H04L 63/0815* (2013.01); *H04L 63/10* (2013.01); *H04L 63/102* (2013.01); *H04L 63/0853* (2013.01)
(58) Field of Classification Search
USPC .......................................................... 726/5
See application file for complete search history.

(56) References Cited

U.S. PATENT DOCUMENTS

| 5,440,541 | A | * | 8/1995 | Iida et al. | 370/352 |
| 5,594,722 | A | * | 1/1997 | Iida et al. | 370/426 |
| 7,496,953 | B2 | * | 2/2009 | Andreev et al. | 726/8 |

(Continued)

FOREIGN PATENT DOCUMENTS

WO    WO 03/073242 A1    9/2003

OTHER PUBLICATIONS

Extensibility, Safety, and Performance in the SPIN Operating System|http://citeseerx.ist.psu.edu/viewdoc/download?doi=10.1.1.117.6702&rep=rep1&type=pdf|Bershad et al.|1995|pp. 1-18.*
Schmidt, A.U. et al., "Efficient Application Single-Sign-On for Evolved Mobile Networks", Proceedings of the Wireless World Research Forum Meeting 25 (WWRF 25), Sep. 6, 2010, XP055035437, Retrieved from the Internet: URL:http://andrea.schmidt.novalyst.de/docs/WWRF_25_Efficient_SSO_for_3G_Networks.pdf [retrieved on Aug. 13, 2012].

(Continued)

*Primary Examiner* — Mahfuzur Rahman
(74) *Attorney, Agent, or Firm* — Baker & Hostetler LLP

(57) ABSTRACT

A user of a mobile communications device may access services in a target domain using a source domain identity that is used to access services in a source domain. To enable such a use of the source domain identity in the target domain, the source domain identity may first be enrolled in the target domain. The enrollment may be facilitated by an enrollment entity at the target domain, such as a gateway or an OpenID server for example. The enrollment entity may establish a secure channel with the user's device for enabling enrollment of the source domain identity. Once enrolled, the source domain identity may be used for authentication of the user in the target domain. Enrollment of the source domain identity and/or authentication of the user based on the enrolled source domain identity may be implemented using a local OpenID provider (OP) residing on the user's device.

19 Claims, 14 Drawing Sheets

(56) References Cited

U.S. PATENT DOCUMENTS

| | | |
|---|---|---|
| 2004/0128390 A1 | 7/2004 | Blakley, III et al. |
| 2004/0250118 A1* | 12/2004 | Andreev et al. ............... 713/201 |
| 2009/0126000 A1* | 5/2009 | Andreev et al. .................. 726/8 |
| 2009/0292927 A1* | 11/2009 | Wenzel et al. ................ 713/185 |
| 2010/0064234 A1* | 3/2010 | Schreiber et al. ............. 715/760 |

* cited by examiner

CLIENT AND SERVER GROUP SSO WITH LOCAL OPENID

CROSS-REFERENCE TO RELATED APPLICATIONS

This application is the national stage of PCT/US2012/020496, filed Jan. 6, 2012, which claims the benefit of priority to U.S. Provisional Patent Application No. 61/430,869, filed Jan. 7, 2011, the disclosures of which are incorporated herein by reference in their entireties.

BACKGROUND

The use of mobile communications devices enables users to access a number of services as they are moving from one location to another. For example, a user may come into proximity of various wireless networks or domains when moving locations. Each network may offer a number of services to the user. In order to access these services, the user may have to login to the network using a registered user identity. This registered user identity may be used by the service provider to authenticate the user to allow the user to access its services.

If the user wants to access services in another network or domain, the user may be forced to perform another registration. If the user attempts to use the user identity that has been registered in another domain, they may receive an error message. Thus, the user may be forced to register separately with each network in which the user wishes to access services from a service provider. This may require the user to remember many different registered identities. Alternatively, the user may register the same, or similar, identity in each network to avoid having to remember each of the different registered identities. This may present security concerns as an attacker may acquire the identity for one network and, as a result, have access to other networks in which the user has used this same identity.

Some service providers may implement OpenID to address some of these concerns. However, even in OpenID a client may belong to a domain which is defined by its discovery and trust relationships with the domain entities. The client may not be able to login with a relying party (RP) that belongs to another identity domain, because this RP does not have a trust relationship with the authentication entities in the source domain, and thus may not trust authentication from the client.

SUMMARY

This Summary is provided to introduce various concepts in a simplified form that are further described below the Detailed Description.

Systems, methods, and apparatus embodiments are described herein for identity federation between a source domain and a target domain. As described herein, a source domain identity may be enrolled in a target domain and a user may be authenticated in the target domain using the source domain identity. The source domain identity may be associated with a user. The source domain identity may enable the user to access a source domain service in the source domain. The source domain identity may be enrolled in the target domain to enable the user to access a target domain service using the source domain identity. Authentication of the user may be enabled at the target domain using the enrolled source domain identity. The authentication may be performed using an OpenID provider (OP). For example, the OP may be a local OP residing on the user's device. The user may access to the target domain service once the user has been authenticated.

According to another example embodiment, the source domain identity may be sent to the target domain to obtain access to a service at the target domain. The source domain identity may enable the user to access a source domain service at a source domain for example. A request for an authentication of the user may be received to enable enrollment of the source domain identity at the target domain. The user may be authenticated using a local identity provider at the user's device. A secure channel may be established with an enrollment entity at the target domain. The enrollment entity may be configured to enable the enrollment of the source domain identity at the target domain for example. The authentication of the user may be sent to the enrollment entity using the established secure channel.

According to another example embodiment, a request may be received for performing a local authentication of the user to authenticate the user at the target domain using the source domain identifier. The authentication of the user may be performed using the local identity provider on the user's device. A secure channel may be established with a service provider configured to provide a service at the target domain. The local authentication of the user may be sent using the secure channel with the service provider to enable access to the services.

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not limited to embodiments that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
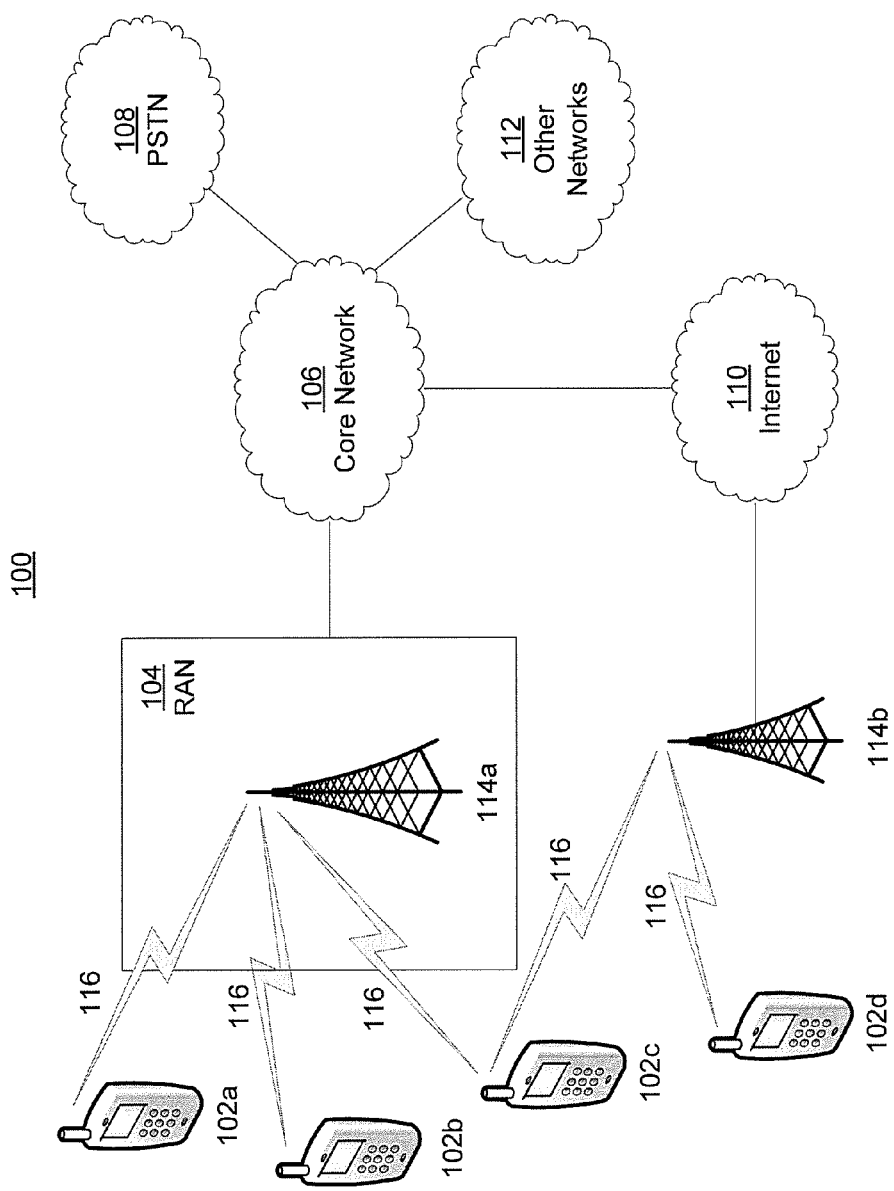
FIG. 1A is a system diagram of an example communications system in which one or more disclosed embodiments may be implemented.

A description of terms used herein is provided. Local IdP is a term for a client-localized entity and functions of such entity that may enable identity assertion for a user/device made locally (i.e., very near to the device). RP is Relying Party in the OpenID protocol or other application service provider attempting to verify a user's/device's identity and having a trust relationship with an identity provider. OP is an OpenID provider protocol entity. GW is a gateway, such as an entity controlling internet traffic between connected entities for example. BA is a browsing agent and may include any web-based environment, application, or service on a user device capable of accessing the Internet. OIDx is the OpenID identifier (e.g., URL or email address) of a user in identity domain$^X$. $OP_X$ is an OpenID provider of an OpenID identity domain$^X$. $OPSF_X$ is an OpenID server or entity having an OpenID service function (OPSF) in identity domain$^X$. $OP_{agg,X}$ is an OpenID provider aggregation entity ($OP_{agg}$) in identity domain$^X$. $RP_X$ is a Relying Party in identity domain/service group$^X$. U is a generic mobile user. UE is a generic mobile user's mobile device.

Local mobile SSO is a term used to collectively indicate part or whole of the single sign-on (SSO) and/or related identity management functions traditionally performed by a web-based SSO server. The local mobile SSO may be performed by a locally-based entity and/or module, which may be a part or whole of the communicating device itself for example. The locally-based entity/module may be physically and/or logically located (i.e., locally located) in close vicinity of the communicating device and/or its user (e.g., where such entity/module is embedded in the device, or attached or connected by local interfaces or wiring or short-range wireless means to the device). Local OpenID is a term used to indicate a subset of local mobile SSO implementations, whereby the implementation of SSO or identity management may be based on the OpenID protocol. The part or whole of the functions of an OpenID identity provider (OP or OpenID IdP) may be performed by the locally located entity/module.

Local identity provider (IdP) is a term used to indicate the entity or module that may perform the part or whole of the functions of an OpenID server. $OP_{loc}$ may also be used to denote a local IdP. $OP_{loc}$ may be a local OP associated with a local entity, such as software or hardware for example. $OP_{loc}$ may perform operations to implement the OpenID identity provider. According to one example, $OP_{loc}$ may be implemented on a Smartcard Web Server (SCWS) or other trusted processing module. One of the functions of the $OP_{loc}$ may be to facilitate authentication of the user and/or the device through assertion(s) about the identity of the user and/or the device. Such an assertion may be sent from the $OP_{loc}$ to the device's browser agent (BA) or other application which then may forward the assertion to the external relying party (RP). When the function(s) provided by an $OP_{loc}$ are primarily limited to providing such identity assertion, an $OP_{loc}$ performing such function(s) may be called local assertion provider (LAP).

An $OP_{loc}$ may process (e.g., create, manage, and/or send) one or more assertion message(s). The $OP_{loc}$ may use these messages to assert to the state of verification of one or more identity (or identities) relating to a user and/or a device. This assertion may be made to one or more external recipients of such messages. In the OpenID protocol, a third-party entity, such as an RP for example, may be one of the recipients of such assertion message(s). The $OP_{loc}$ may sign such assertion messages, such as by using a cryptographic key for example.

Local OpenID may implement one or more cryptographic keys. One such key, which may be called a root session key and denoted by $K_{rp}$, may be a session key intended for use between the RP and the OP to serve as a root session key out of which other keys may be derived. Another such key, which may be called an assertion key and denoted by $K_{asc}$, may be the signing key which may be used to sign one or more of the assertion message(s) for authentication of the user. $K_{asc}$ may be derived from the $K_{rp}$.

Local OpenID may also implement a service called OpenID server function (OPSF), whose role may be to generate, share, and/or distribute secrets or signatures to be used by the $OP_{loc}$ and/or optionally by the RP. The OPSF and the $OP_{loc}$ may be viewed by the external RP as a single entity. The OPSF may be able to verify signatures issued by the $OP_{loc}$ and/or local OP, and may be directly reachable for the RP via public internet. The browser or other application on the device may be redirected to the $OP_{loc}$ by modifying the local domain name server (DNS) resolving cache on the device such that the address of the OPSF may map to the $OP_{loc}$. The OPSF and/or the gateway-based OP may be acting from the perspective of the RP as if they were a single entity. The OPSF may be able to verify signatures issued by the gateway-based OP and/or $OP_{loc}$ and may be directly reachable for the RP via public internet. The browser or other application on the device may be redirected to the gateway-based OP by modifying the local DNS resolving cache on the device such that the address of the OPSF maps to the local gateway-based OP. According to an example embodiment, the OPSF may be co-located with $OP_{agg}$.

$OP_{agg}$ may be an OpenID provider identity aggregation function. The $OP_{agg}$ may be a service used by local OpenID, whose role may be to facilitate discovery of $OP_{loc}$ on behalf of the RP. $OP_{agg}$ may be an entity that provides the discovery service for the RPs. Such an OP operation service may be, according to the OpenID standards, via HTML or XRDS discovery. The $OP_{agg}$ entity may be running at the DNS address which is part of the OpenID identifier (e.g., if the identifier is http://openid.mno.com/id, then the $OP_{agg}$ may run a web service at http://openid.mno.com). For example, the $OP_{agg}$ may be a server in the mobile network operator's (MNO's) domain that may operate as a discovery service. Discovery service may be via public internet and may be lightweight.

$AUTH_G$ is an authentication performed to a target domain$^G$, via a gateway GW for example. $ENR_G$ is an OpenID enrollment to a target domain$^G$, which may also be performed via a gateway for example. LAA is a local authentication agent that may perform any form of user authentication (e.g., strong user authentication) and may be able to assert it to $OP_{loc}$. For example, the LAA may be associated with a biometric device, a smart card reader, cryptographic token, or the like. PIN is a personal identification number. $K_X$ is a long-term shared secret between $OPSF_X$ and $OP_{loc}$ in identity domain$^X$ for OpenID association mode. SEE is a secure execution environment.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, femto cell base station, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
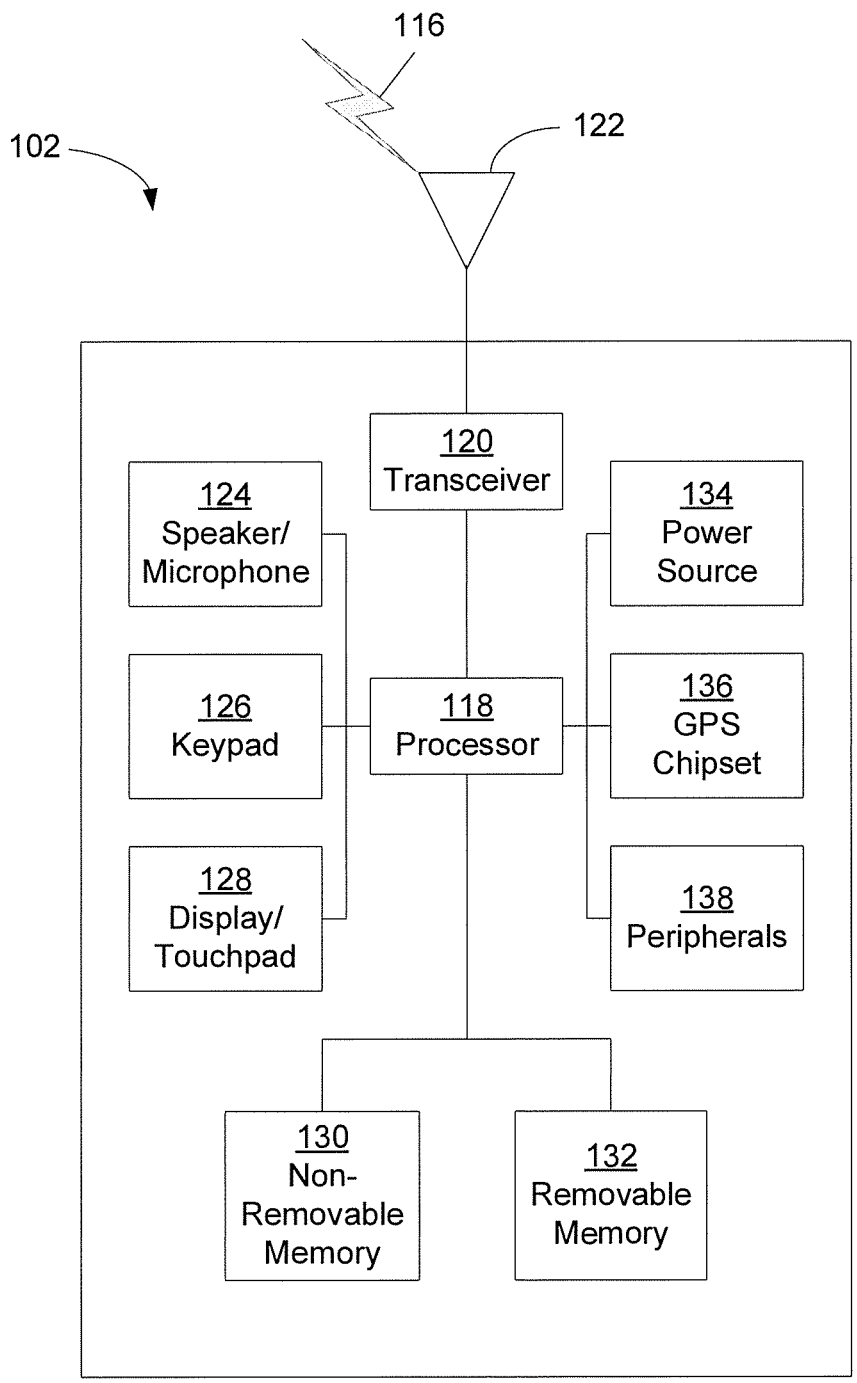
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip. The processor 118 may perform application-layer programs (e.g., browsers) and/or radio access-layer (RAN) programs and/or communications. The processor 118 may perform security operations such as authentication, security key agreement, and/or cryptographic operations, such as at the access-layer and/or application layer for example.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
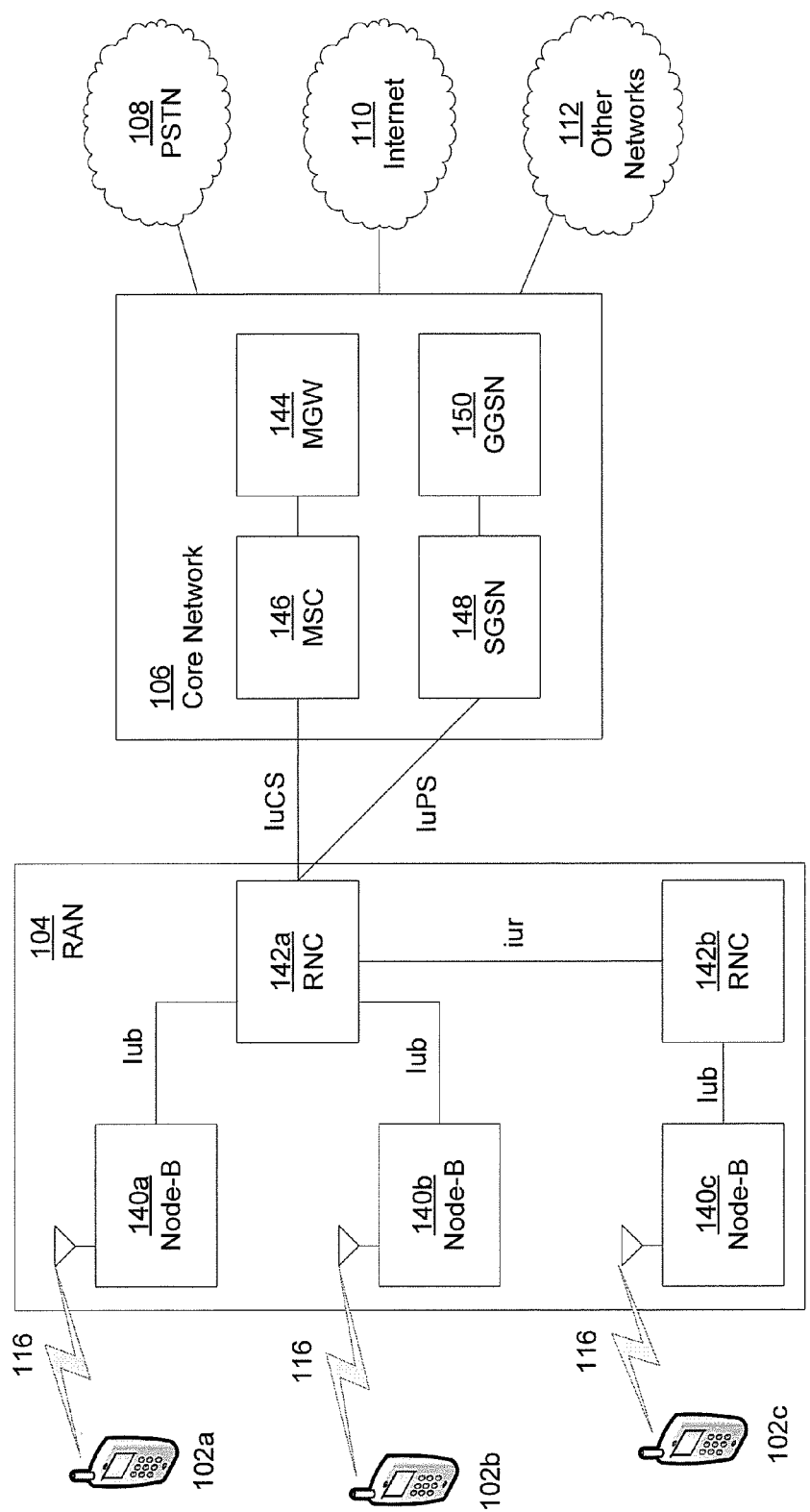
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140*a*, 140*b*, 140*c* may each be associated with a particular cell (not shown) within the RAN 104. The RAN 104 may also include RNCs 142*a*, 142*b*. It will be appreciated that the RAN 104 may include any number of Node-Bs and RNCs while remaining consistent with an embodiment.

As shown in FIG. 1C, the Node-Bs 140*a*, 140*b* may be in communication with the RNC 142*a*. Additionally, the Node-B 140*c* may be in communication with the RNC 142*b*. The Node-Bs 140*a*, 140*b*, 140*c* may communicate with the respective RNCs 142*a*, 142*b* via an Iub interface. The RNCs 142*a*, 142*b* may be in communication with one another via an Iur interface. Each of the RNCs 142*a*, 142*b* may be configured to control the respective Node-Bs 140*a*, 140*b*, 140*c* to which it is connected. In addition, each of the RNCs 142*a*, 142*b* may be configured to carry out and/or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142*a* in the RAN 104 may be connected to the MSC 146 in the core network 106 via an IuCS interface. The MSC 146 may be connected to the MGW 144. The MSC 146 and the MGW 144 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices.

The RNC 142*a* in the RAN 104 may also be connected to the SGSN 148 in the core network 106 via an IuPS interface. The SGSN 148 may be connected to the GGSN 150. The SGSN 148 and the GGSN 150 may provide the WTRUs 102*a*, 102*b*, 102*c* with access to packet-switched networks, such as the Internet 110, to facilitate communications between and the WTRUs 102*a*, 102*b*, 102*c* and IP-enabled devices.

As noted above, the core network 106 may also be connected to the networks 112, which may include other wired or wireless networks that are owned and/or operated by other service providers.

The aforementioned communication system and/or systems may be used in performing authentication based on OpenID as described herein. According to an example embodiment, a user may attend a work conference in which they wish to project work-related data using a projection service at the conference. The work-related data may be stored on a cloud service (e.g., via a T-MOBILE® cloud) at their work domain, but the conference domain may have Wi-Fi projection services accessible on site. The user may not have a user identity registered at the conference domain that is appropriate for enabling use of the projection services. However, the conference domain and the user's work domain may both be OpenID accessible. Thus, using the embodiments described herein, the user may gain access to the Wi-Fi projection service at the conference domain using the user's registered identity at their work domain.

With mobile local OpenID, authentication may be performed based on OpenID, where the authenticating entity, such as an OP for example, may be distributed. The OP may include an $OP_{loc}$ which may be localized on a UE. For example, the $OP_{loc}$ may include a smartcard web server (SCWS), which may include an OP localized on a smart card (e.g., a UICC) on the UE. According to an embodiment, an application of OP entities localized on clients in an SSO scheme may be described herein. Groups of clients and/or services, such as RPs for example, may be dynamically managed to provide context-rich SSO. The embodiments described herein may be mapped to the application scenario of physical and/or service access control in a managed facility.

Identity federation and/or grouping may be implemented in the context of OPs localized on OpenID clients. Described herein are systems and methods for federation of local OP-based identities between different domains. Also described herein are systems and methods for managing groups of users and/or relying parties.

Identity federation may allow the use of a client identity which may be valid in one domain for use in performing authentication within another domain, where the client identity may not initially be valid. In the context of IdM realized on the basis of client-localized OPs, at least one example of identity federation is described in FIG. 2.

Figure 2:
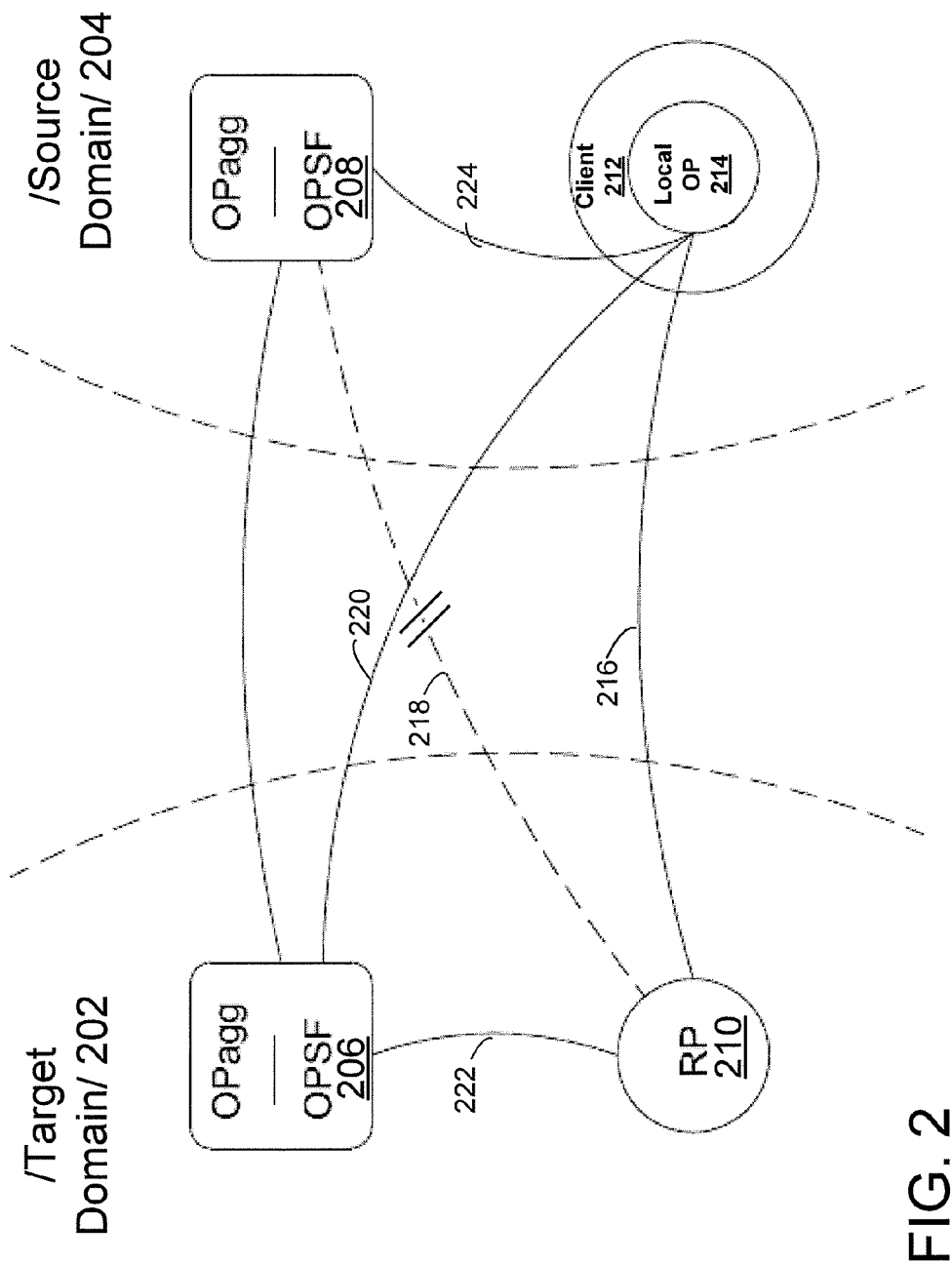
FIG. 2 illustrates a source and target identity domain for federation in the context of local OpenID.

FIG. 2 illustrates a source identity domain 204 and target identity domain 202 for federation in the context of local OpenID. As illustrated in FIG. 2, there may be discovery and/or trust relationship problems when communication is performed between a target domain 202 and a source domain 204 using a client identity of client 212 that has been established in the source domain 204. Network entities in target identity domain 202 may be in communication with entities in the source identity domain 204. The target identity domain 202 may include an $OP_{agg}$/OPSF 206 and a relying party (RP) 210. $OP_{agg}$/OPSF 206 and the relying party (RP) 210 may perform trusted communications at 222. The source identity domain 204 may include an $OP_{agg}$/OPSF 208 and the client 212. The client 212 may include a local OP 214 for providing authentication information of the client 212 and/or a user of the client 212. The $OP_{agg}$/OPSF 208 and the client 212 may perform trusted communications at 224. $OP_{agg}$ 206 and $OP_{agg}$ 208 may include an OpenID discovery function and may be an entity where multiple OPs may be aggregated for discovery for example. OPSF 206 and OPSF 208 may include an OpenID service function.

The source identity domain 204 may be defined by the identity domain's discovery and trust relationships with the domain entities $OP_{agg}$ 208 and OPSF 208, respectively. The client 212 may request login at 216 with RP 210 that belonging to the target identity domain 202. In order to log in, the client 212 may provide authentication information from the local OP 214 at 216. For example, the authentication information may be provided as a result of a local authentication of the user and/or client 212. The RP 210 may not have a trust relationship with the OPSF 208 of the source identity domain 204, as indicated by the dotted line at 218 for example, and thus may not trust authentication information from the client-localized OP 214.

Described herein are various embodiments that may be used in establishing a trusted relationship between entities in the source identity domain 204 and the target identity domain 202 to enable an RP, such as RP 210 for example, to trust authentication information received from an OP, such as the local OP 214 for example. According to an example embodiment, a trust relationship may be established at 220 between the OPSF 206 of the target identity domain 202, whom the RP 210 trusts, and the localized OP 214 of the client 212. If there is no pre-existing trust relationship between them at 220, the trust relationship may be established by mediation of trust between the OPSF 208 of the source identity domain 204 and the OPSF 206 of the target identity domain 202 for example.

Structurally, the lack of a trusted relationship between an RP in a target domain and an OPSF/OP$_{agg}$ in a source domain, as illustrated at 218 of FIG. 2 for example, may be similar to the lack of a trusted relationship in identity federation as illustrated by Liberty Alliance standards for example.

When using a local OP, other OP entities may not be involved. One client-local OP may be implemented for example. Domain policies may also be enabled, such as access control and/or access privacy to enable granular separation between domains. Using access control and/or access privacy, the source identity domain 204 may not know of each login in the target identity domain 202, and vice versa. The local OP 214 may work seamlessly to enable a user to use the same OpenID identifier when communicating in another identity domain. When using local OP, manual change of addressing may also be avoided and users may be aware of the domain in which they are acting. The local OpenID protocol flow may not be changed, such as from the viewpoint of the RP 210 for example, when implementing the embodiments described herein.

OpenID may rely on URL-based identities (i.e., given names which are under user control and/or point to the discovery location for the OP the user has chosen), which may cause identity federation. According to an example embodiment, federation may be overcome by allowing the user to assign a separate OpenID identity URL for each OP domain and/or use the separate OpenID identity URL with the corresponding RPs. Federation may also be overcome by enabling automation, without depriving users of control.

Identity federation may not be an issue if the OP function is completely and/or wholly implemented within a client local device (e.g., on a mobile communication device and/or a UICC on the mobile communication device). If the OP function is completely and/or wholly implemented within a client local device, identity assertion for the user may be via a single local OP (e.g., local OP 214) and/or the local OP's domain (e.g., the source identity domain 204). This may create less or no federation among different domains. RPs (e.g., RP 210) may be served by the single local OP (e.g., local OP 214). This may implement domain separation for domains locally.

Complete de-centralization of identity management may not be desired. An IdM may take into account trust and/or business relationships between various stakeholders. This may call for some network, and/or provider-side, control over the identity assertions which a local entity under user control may be allowed to make.

Identity federation may become more manifest with a distributed approach, such as local OpenID using a local assertion provider on a local client device and/or some network-based entities such as OP$_{agg}$/OPSF that belong to one specific domain, such as an MNO's domain that may share secrets with the local assertion provider for example. This may be because the local assertion being made in such a system may share strong secrets with one particular domain. For example, if the user with a registered identity in a source domain wants to receive service from an RP that belongs to another domain than the one strongly linked to the local assertion provider, then the source domain's credentials may not be automatically useable to make identity assertions about the user to such a target-domain RP. In such a case, an automated identity federation may become a desired feature. As described herein, such distributed local domain-specific OP functions may be described as a target for inter-domain identity federation.

In local OP federation, an OpenID identity may be enrolled in a target domain and/or the OpenID identity may be used for authentication. The enrollment of the OpenID identity may use a pre-existing trust relationship between the OPSF/OP$_{agg}$ elements in the source identity domain (domain$^S$) and the target identity domain (domain$^T$), so that identification of the user toward the target identity domain may succeed. The enrollment phase may include the negotiation, within the target identity domain, of an authentication secret between a server and a local OP. The negotiation of the authentication secret may be independent from the source identity domain, which may be used for domain separation. The secrets shared in the target identity domain may not be known, or easily reproducible, by entities in the source identity domain. This may rule out simple key derivation, in a target identity domain, by a common method between an OPSF and a local OP. If the derivation and/or root secret are known to the source domain's OPSF, the source domain's OPSF may reproduce the root secret and/or impersonate the local OP, and/or the user, in the target domain. The source domain's OPSF may even be able to impersonate the target domain OPSF. Thus, the target domain's OPSF and local OP may run a proper key agreement bound to an authentication (e.g., a proper AKA) in an enrollment phase.

An OpenID identity may be implemented for authentication using OpenID. For example, local management of OpenID identifiers, such as use of the correct OpenID identifier for the corresponding RP in each identity domain, may seem unavoidable due to the central role of the OpenID identity URL in the discovery phase. However, in some domains Internet routing may be constrained or may be influenced, such as when clients in a domain connect through a particular set of gateways for example. Such gateways may be used to rewrite OpenID identifiers, as described herein for example.

An authentication process between an entity in a source identity domain and a federated OP in a target identity domain may be initiated using various options. For example, an OpenID client (e.g., a browser with an appropriate plugin) or another entity within the OpenID client may be used that knows the mapping of identity (e.g., URL) to RP in each trust domain. This may raise security concerns as it may open inroads for attacks via manipulation of the mapping table. According to another option, when the user browses to a login page of the target identity domain, it may select the correct OpenID identifier and/or propose it to the user for authentication usage with the RP, via some form of auto-completion for example. Techniques such as data scraping may also be used. These auto-completion and scraping techniques may also raise security concerns, as they may open inroads for phishing attacks. Another option for authentication may be to localize the discovery entity OP$_{agg}$ at the client. For example, the discovery entity OP$_{agg}$ may be associated with the local SCWS. Since OP$_{agg}$ may have a public IP address, this option may not be implemented for large scale deployments. A local OP$_{agg}$ may manage the OpenID identifier to RP mapping for the various OpenID trust domains to which the user may be enrolled. A centralized option may also be used, which may be akin to ID federation using PKI in the background. This option may have an overarching OP$_{agg}$ entity which may serve a multitude of trust domains, and which may leverage the deployment of a centralized infrastructure of classical ID federation. Inter-domain co-operation may be difficult in this option, as it may not be clear who is in control of the federation OP$_{agg}$. This may raise privacy concerns since the central OP$_{agg}$ may gain knowledge about all authentications of a user across all domains.

The relationship between the federation of local OPs and the establishment of SSO groups and/or group-based control over authentication and access are also described herein. In OpenID authentication, the OpenID identity OID$_X$, belonging to the domain$^X$ of an OpenID provider, may be mapped in the OpenID discovery phase to the address of the corresponding OpenID provider. In local OpenID, this may be the address of OPSF$_X$. In OpenID, OPSF$_X$ may not discriminate between relying parties (RPs). To establish groups of services, one implementation may close the domain$^X$. That is, a list $\{RP_X\}$ of RPs belonging to the domain$^X$, or service group$^X$, may be defined and OPSF$_X$ may be functionally augmented by a simple policy decision and enforcement procedure. That is, OPSF$_X$ may reject authentication requests from an RP$_Y$ not in $\{RP_X\}$. This may turn local OpenID from a closed user group to a closed user and/or service group authentication scheme. Entities described herein (e.g., the OP$_{agg}$ discovery entity and/or OPSF) may have a functionality to facilitate inter-domain federation.

When more than one service group exists to which a user has access via local OpenID authentication, an extension of the above mapping of RPs to OPSFs may be performed. The generalization of the above service group may be a mapping such as Equation 1, $$\{(OID, RP)\} \rightarrow \{OPSF\}, \quad \text{Equation 1}$$

which maps an OpenID identifier (OID) and an RP to one or more OPSFs which may be able to authenticate the user for the domain/group to which RP belongs. One place in local OpenID procedures to implement this mapping may be the discovery phase. For example, the entity OP$_{agg}$, or a meta-entity on top of a set of OP$_{agg}$s, may store this association table. Due to the use of global identifiers (e.g., global URIs as identifiers) in OpenID, the association table may be global. The mapping may be organized in various ways. For example, it may map any (OID*, RP$_X$) to OPSF$_X$ in this way supporting the service grouping rather than the user subscription to a specific group. The latter may be enforced by OPSF$_X$, as described herein.

Federation is the process which supports a user who desires to roam between the respective service group$^S$, in the source domain for example, and the service group$^T$, in the target domain for example. The user may be able to gain access to the target domain$^T$'s services using the user's OpenID identifier from the source domain$^S$. In the notation introduced above, this means that associations $$OID_S \times \{RP_T\} \rightarrow OPSF_T \quad \text{Equation 2}$$

may be established, for a user coming from a domain where the user has OpenID identifier OID$_S$, which the user may want to use transparently in domain$^T$ toward services belonging to the domain$^T$/group$^T$. Apart from establishing the mentioned associations for the discovery process, this may cause establishment of a shared secret and/or signature between the OP$_{loc}$ belonging to the user or UE with OID$_S$ and OPSF$_T$. The process which leads to this association and/or establishment is called enrollment and is further described herein.

One implementation of enrollment may include the establishment of a gatekeeper service between domain$^S$ and domain$^T$. This service may be a special RP of domain$^S$ whose role may be to establish the service associations for OID$_S$, and/or facilitate the establishment of the shared secrets and/or signatures. The gatekeeper service may establish the service associations and/or facilitate establishment of shared secrets and/or signatures after it has received proof of authentication in domain$^S$, in an OpenID authentication for example. The gatekeeper service may also evaluate policies governing the federation. The enrollment process may be made transparent. For example, the enrollment process may take place seamlessly when a user first tries to log on to a service of domain$^T$.

Enrollment to and authentication in a domain of a gateway (GW) may be performed as described herein. The GW may be an entity of a target domain, which may be identified herein as domain$^T$ and/or domain$^G$ for example. The GW may be an entity in the target domain of a maximally separated architecture for example. This process of enrollment of OpenID to the target GW in the target domain$^G$ is called ENR$_G$. The entities GW, OPSF$_G$, and OP$_{agg,G}$ may be kept separate in the protocols described herein. According to another embodiment, in gateway-based local OP federation, the functions of these entities may be co-located at a single entity, such as on the GW for example, which may reduce traffic.

Figure 3:
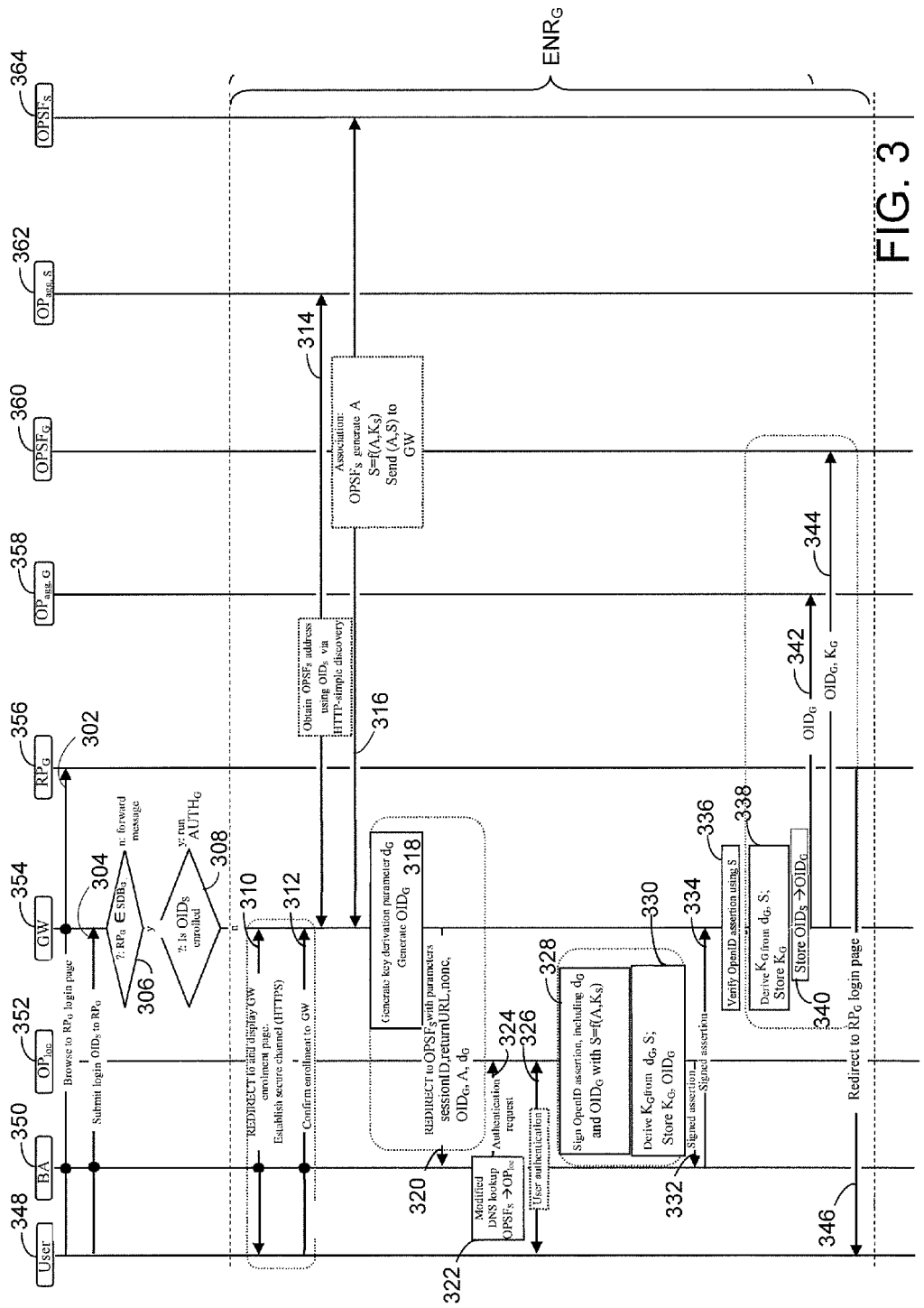
FIG. 3 is a flow diagram illustrating a gateway-based local OpenID enrollment protocol.

FIG. 3 is a flow diagram illustrating an example embodiment of target domain enrollment via a GW 354. The protocol illustrated in FIG. 3 may be used to enroll an OP$_{loc}$ 352 in the domain$^G$ of a GW 354. GW 354 may maintain a database of affiliated relying parties (e.g., SDB$_G$=RP$_G$ in a domain$^G$, where domain$^G$ refers to the target domain that the device may reach via GW 354). GW 354 may maintain a database which includes the many-to-one mapping of OpenID identifiers in domain$^G$ to those in the source identity domain$^S$. The database of affiliated RPs and the database of OpenID identifiers may be the same or different databases.

In operation of GW 354, the GW 354 may be able to listen to and/or intercept the communication between BA 350 and RP$_G$ 356 during enrollment. The BA 350 may be a browsing agent or other application capable of network communication residing on a device operated by user 348. The GW 354 may listen to and/or intercept the communication between BA 350 and RP$_G$ 356 by employing techniques such as data scraping on the BA 350 for example. The scraped information may be transmitted from the device on which the BA 350 resides to the GW 354. This may enable GW 354 to recognize if a new user device wishes to access an affiliated service and/or trigger enrollment of this device's OP$_{loc}$ 352 to the domain$^G$. These described procedures are illustrated in the protocol flow of FIG. 3, such as before the enrollment protocol procedure ENR$_G$.

As illustrated in the protocol flow of FIG. 3, a user 348 may browse to a login page of RP$_G$ 356 at 302. For example, the user 348 may use the BA 350 to communicate, via GW 354, with the RP$_G$ 356. At 304, the user 348 may login by submitting an OpenID identifier for a source domain$^S$ (OID$_S$) to GW 354. The GW 354 may check the database SDB$_G$ of identifiers associated with RP$_G$ 356 at 306 to see if SDB$_G$ includes the OID$_S$ received from user 348. If the SDB$_G$ includes OID$_S$, then the user 348 may be authenticated for services in the target domain$^G$ using OID$_S$. If, however, the SDB$_G$ does not include OID$_S$, then OID$_S$ may be enrolled in target domain$^G$. For example, the OID$_S$ may be enrolled in domain$^G$ using ENR$_G$ (steps 310-346 of FIG. 3, or a combination of thereof).

In performing ENR$_G$, the user 348 may be redirected, via BA 350 for example, to the enrollment page of GW 354 at 310. At 312, the GW 354 may obtain from the user 348, via BA 350 for example, confirmation of the intent to join domain$^G$. At 314, the GW 354 may obtain the address of the OPSF$_S$ 364, of the source domain$^S$, from OP$_{agg,S}$ 362 using the OID$_S$. The address of the OPSF$_S$ 364 may be obtained using HTTP-simple discovery for example. The GW 354 may perform an association with OPSF$_S$ 364 at 316, where OPSF$_S$ 364 may generate an association handle A and a signing key S. The association handle A may be a nonce or other random number generated by OPSF$_S$. The signing key S may be a signing key used by OPSF$_G$ to generate an assertion signature and may be derived from association handle A. Association handle A may be passed to the OP$_{loc}$ 352 as described herein, wherein it may again be used to derive the signing key S, which may also be used to create the assertion signature at $OP_{loc}$ 352. The assertion signature may be verified by the $RP_G$ 356 and/or the $OPSF_S$ 364 as both of them know the signing key S. The singing key S may be used to verify assertions at the GW 354. S may be a signing key derived from the association handle A and a key $K_S$, using a key derivation function for example. $K_S$ may be a pre-determined root key that is shared between $OPSF_S$ 364 and $OP_{loc}$ 352 in the source domain$^S$. $K_S$ may be a pre-established key that may be used to create a trust relationship between $OPSF_S$ 364 and $OP_{loc}$ 352.

Association handle A and signing key S may be sent to GW 354 at 316. Using A and S, GW 350 may generate key derivation parameter $d_G$ and/or OpenID identifier $OID_G$ at 318. The key derivation parameter $d_G$ may be used to establish a secret between GW 354 and $OP_{loc}$ 352. According to an example embodiment, $d_G$ may be a random number (e.g., random number based on the time and/or date) that is difficult or impossible to determine by independent network entities, but which is shared between the GW 354 and $OP_{loc}$ 352. $OID_G$ may be an OpenID identifier for the domain$^G$ which may be used for accessing services at $RP_G$ 356. The $OID_G$ may be associated with the $OID_S$ originally received from user 348 and/or the user 348's device.

At 320, the GW 354 may redirect BA 350 to the $OPSF_S$ 364 to initiate and/or determine user authentication at the source domain$^S$. The redirect message may include the sessionID, a returnURL, a nonce, $OID_G$, association handle A, and key derivation parameter $d_G$, or any combination thereof. These parameters may be sent in an OpenID extension for example. At 322, the BA 350 may perform a modified DNS lookup of $OPSF_S$ 364 to determine $OP_{loc}$ 352 for performing local user authentication. The BA 350 may send an authentication request to $OP_{loc}$ 352 at 324. The authentication request at 324 may include the $OID_G$, association handle A, key derivation parameter $d_G$, and/or one or more other parameters received in the redirect message from GW 354. At 326, the $OP_{loc}$ 352 may perform local user authentication with the user 348 (e.g., by obtaining user credentials that may be locally verified). The $OP_{loc}$ 352 may sign an assertion (e.g., an OpenID assertion) at 328 that includes the key derivation parameter $d_G$ and $OID_G$ with signing key S, where S is derived at $OP_{loc}$ 352 as a function of A and $K_S$ in a similar manner as at $OPSF_S$ 364. At 330, the $OP_{loc}$ 352 may derive the secret key $K_G$ for domain$^G$ from key derivation parameter $d_G$ and signing key S. Secret key $K_G$ may be a key established at the $OP_{loc}$ 352 and the GW 354 that is shared between the $OPSF_G$ 360 and GW 354. $OP_{loc}$ 352 may store $K_G$ and $OID_G$ for subsequent use at 330.

The $OP_{loc}$ 352 may send the signed assertion to BA 350 at 332. The BA 350 may forward the signed assertion to the GW 354 at 334. At 336, the GW 354 may verify the signed assertion using signing key S, which it received from the $OPSF_S$ 364. The GW 354 may derive the shared key $K_G$ for the target domain$^G$ from key derivation parameter $d_G$ and signing key S at 338. The shared key $K_G$ may be shared between GW 354 and $OP_{loc}$ 352. The GW 354 may store shared secret $K_G$ at 338 for later use. If the GW 354 determines that the user 348 has been properly authenticated (e.g., by verification of the authentication assertion at 336), the GW 354 may also store the association of $OID_S$ to $OID_G$ at 340. The GW 354 may send the $OID_G$ to the $OP_{agg,G}$ 358 at 342, and the $OID_G$ and/or $K_G$ to $OPSF_G$ 360 at 344. At 346, the user 348 and/or the user 348's device may be redirected to the login page of $RP_G$ 356.

In enrollment the shared secret $K_G$ may be established to sign subsequent assertions (e.g., OpenID assertions) in the domain$^G$. This secret $K_G$ may be derived from a key derivation parameter $d_G$ in a secure way. This may avoid having to establish a secure channel end-to-end between domain$^G$ and $OP_{loc}$ 352. Details on security implementation options are further described herein.

As illustrated in FIG. 3, in the steps of enrollment in domain$^G$ ($ENR_G$), GW 354 may operate as a relying party (RP) running the local OpenID protocol with $OP_{loc}$ 352 for authentication. The latter protocol may be augmented by generation of the domain-specific identifier $OID_G$, the domain-specific key $K_G$, and/or the distribution of this data to pertinent entities. In the domain enrollment protocol, enrollment may occur when a user 348 first requests log-on with an affiliated service of $RP_G$ 356 of the gateway domain$^G$. The user's browser BA 350 may be explicitly redirected to that service's login page, such as by $RP_G$ 356 for example, after successful enrollment. The user experience of combined enrollment and/or log-on to $RP_G$ 356 may be performed seamlessly, such as by using Web 2.0 or similar technologies for example. Care may be taken to not compromise security. For example, a user may be prevented from logging on to another relying party than the desired relying party. One example embodiment for performing seamless log-on to $RP_G$ 356 after $ENR_G$ may be for GW 354 to replay the original log-on message from BA 350 to $RP_G$ 356 and run the OpenID authentication protocol $AUTH_G$, such as the $AUTH_G$ illustrated in FIG. 4 for example, impersonating $OP_{loc}$ 352.

According to another embodiment of enrollment with GW 354, GW secret $K_G$ may be transferred directly from GW 354 to $OP_{loc}$ 352. In this embodiment, a secure channel may be established (e.g., between GW 354 and BA 350, and, transitively, or end-to-end, to $OP_{loc}$ 352) prior to the OpenID run and/or distribution of the shared long-term secret $K_G$. For example, this channel may be protected for confidentiality and/or integrity, while the long-term secret $K_G$ may be transferred from the GW 354 to the BA 350, and from the BA 350 to the $OP_{loc}$ 352. For protection of the device-local transfer of the secrets (e.g., from BA 350 to the $OP_{loc}$ 352) a secure device-local channel protocol may be used. One example embodiment of a secure device-local channel protocol is illustrated in Technical Specification (TS) number 33.110 of the 3$^{rd}$ Generation Partnership Project (3GPP) specifications.

OpenID authentication toward GW 354 may take place after the key $K_G$ is sent to $OP_{loc}$ 352 via BA 350. Until this authentication is completed (e.g., after successful verification, by GW 354 of the signed assertion), GW 354 may not accept $K_G$ as an authentication key for this $OP_{loc}$ 352. That is, if the OpenID authentication in $ENR_G$ fails, GW 354 may discard $K_G$ and/or not deliver this key to $OPSF_G$ 360. If this condition is satisfied, the channel between GW 354 and BA 350 may not need (one-sided, by BA 350) authentication, since this authentication may be included in the protocol itself and/or bound to the key $K_G$ delivery. According to another example embodiment, the secret $K_G$ may be generated by $OP_{loc}$ 352, instead of by the GW 354. The secret $K_G$, once generated at $OP_{loc}$ 352, may be transferred to the GW 354, such as via the secure channel between GW 354 and $OP_{loc}$ 352 for example. This may decrease cryptographic load on GW 354.

According to an embodiment the shared secrets created during establishment of the secure channel between GW 354 and BA 350 may be used. This channel's encryption keys may be taken directly, or by another key derivation process for example. If the shared secrets are created during establishment of the secure channel, then mutual authentication may be part of the establishment of the secure channel. Otherwise OpenID authentication in $ENR_G$ may not be bound to the secure channel endpoints and/or the resulting $K_G$ may be leaked to a man-in-the-middle attacker. An independent key derivation communication protocol may be run in $ENR_G$, such as the Diffie-Hellman protocol for example. Such a protocol may be cryptographically bound to $ENR_G$, as illustrated in FIG. 3 for example.

GW 354 may authenticate to BA 350. This authentication may be made visible to the user 348, such as by an extended validation web certificate for example, for the user 348 to know to which OpenID domain the user 348 may enroll. The local authentication process of the user 348 by $OP_{loc}$ 352 may display the information about the enrollment to the user 348. The $OP_{loc}$ 352 may decide to do this based on the presence of according information, such as $K_G$, in the message received in the authentication request from BA 350. If $OP_{loc}$ 352 shows to the user 348 that it will be enrolling to the domain$^G$ of GW 354 by executing the authentication, then the user 348 may be able to compare and/or match this information to the one previously displayed to the user 348 when the user 348 confirmed the enrollment via BA 346 at 312. This may effectively mitigate attacks on the user enrollment procedure, such as by malware locally installed at the user 348's machine for example, which may mimic a valid enrollment browser window. For user-interface security, a secure user-interface, biometric user authentication, and/or use of secure-images for user 348's identification of the trustworthiness of the end point of the UI, or the like, may be employed.

Domain separation between the source domain$^S$ and target domain$^G$ may be maintained if both domain controllers are trustworthy. For example, the key $K_G$, although derived by independent key derivation, may not in some instances be secure against collusion between the domains. For example, if GW 354 of the target domain$^G$ and $OPSF_S$ 364 of the source domain$^S$ are not trustworthy, they may potentially share authentication information. Another security implementation may enable the domain-specific OpenID identifier $OID_G$ not to be known to the user 348. $OID_G$ may be maintained by $OP_{loc}$ 352 to be used in authentication $AUTH_G$ in the target domain$^G$.

If enrollment fails, internal communication between GW 354, $OPSF_G$ 360, and/or $OP_{agg,G}$ 358 may be performed to keep their respective databases consistent. $OP_{loc}$ 352 may complete enrollment and/or store a domain-specific key $K_G$ and/or $OID_G$, but enrollment of this information by GW 354 to $OPSF_G$ 360 and/or $OP_{agg,G}$ 358 may have failed. In this case, an attempt to authenticate to an $RP_G$ 356 may trigger another run of $ENR_G$, since GW 354 may consider this user as not enrolled. This may result in $OP_{loc}$ 352 storing multiple credentials for one GW domain$^G$. Various embodiments may be implemented to prevent storing multiple credentials on $OP_{loc}$ 352 for a single GW domain$^G$. In one example, $OP_{loc}$ 352 may be able to store credentials in a database sorted by unique GW domain identifiers.

Figure 4:
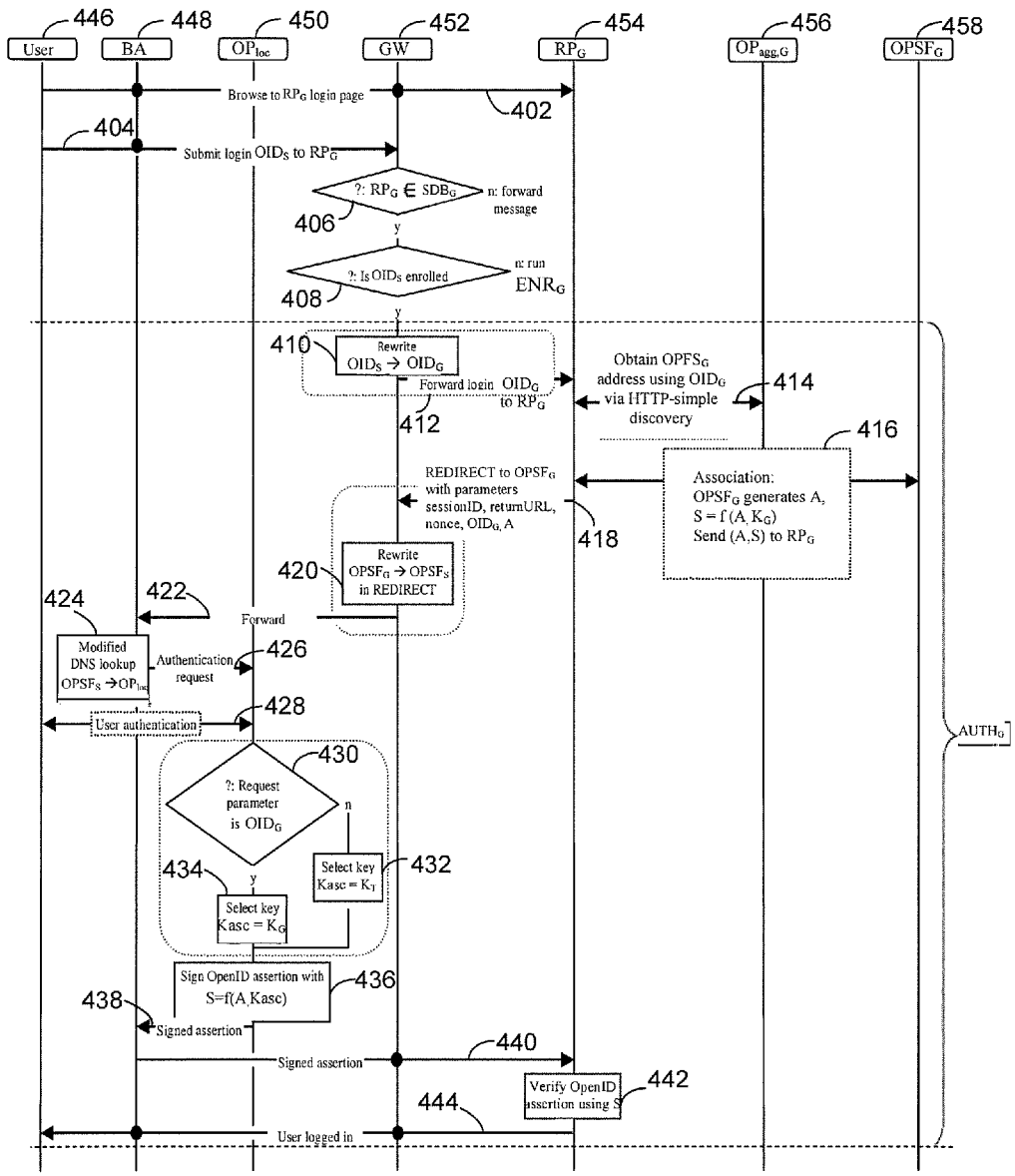
FIG. 4 is a flow diagram illustrating a gateway-based local OpenID authentication protocol.

FIG. 4 is a flow diagram illustrating a Gateway-based local OpenID authentication $AUTH_G$. The authentication $AUTH_G$ may be performed in the target domain$^G$ and may be provided via a GW 452. According to an example embodiment, the $AUTH_G$ may be performed after the enrollment phase $ENR_G$. A shared long-term secret $K_G$ between $OPSF_G$ 458 and $OP_{loc}$ 450 may be used to perform authentication during $AUTH_G$. The existence of the shared long-term secret $K_G$ between $OPSF_G$ 458 and $OP_{loc}$ 450 may be agreed upon between these entities in the enrollment phase $ENR_G$.

As shown in FIG. 4, $AUTH_G$ may be used to log in to a relying party $RP_G$ 454 in domain$^G$ of GW 452. Similar to the enrollment process $ENR_G$ illustrated in FIG. 3, GW 452 may listen to OpenID login requests to affiliated services and/or decide to use the enrolled identity of the user 446, if it exists, instead of the user 446's original identity from the source domain$^S$. As illustrated in FIG. 4, a user 446 may browse to the login page of $RP_G$ 454 at 402. For example, the user 446 may use the BA 448 to communicate, via GW 452, with the $RP_G$ 454. At 404, the user 446 may login by submitting an OpenID identifier for domain$^S$ ($OID_S$) which may be intercepted by GW 452. The GW 452 may check its database $SDB_G$ of identifiers associated with $RP_G$ 454 at 406 to see if $SDB_G$ includes the $OID_S$ received from user 446. At 408, the GW 452 may determine whether $OID_S$ has been enrolled. If the $OID_S$ is not enrolled in $SDB_G$, then the $OID_S$ may be enrolled, using the $ENR_G$ described herein for example. If the $OID_S$ is enrolled and/or is included in $SDB_G$, then the user 446 may be authenticated using the $OID_S$ as illustrated in $AUTH_G$ (e.g., steps 410-444 in FIG. 4, or a combination thereof).

In performing $AUTH_G$, the GW 452 may be used to rewrite $OID_S$ as $OID_G$ at 410. For example, the GW 452 may determine, via its stored database for example, the $OID_G$ that corresponds to $OID_S$. GW 452 may forward the login $OID_G$ to $RP_G$ 454 at 412. At 414, the $RP_G$ 454 may obtain the address of $OPSF_G$ 458 from $OP_{agg,G}$ 456 using $OID_G$. The $OPSF_G$ 458 address may be obtained via HTTP simple discovery for example. $RP_G$ 454 and $OPSF_G$ 458 may perform an association at 416. During association, the $OPSF_G$ 458 may generate association handle A and signing key S. Signing key S may be derived from association handle A and a shared key $K_G$ using a key derivation function. The shared key $K_G$ may be shared between $OPSF_G$ 458 and $OP_{loc}$ 450 and may have been established during the enrollment of $OID_S$ in domain$^G$. Association handle A and signing key S may be sent to the $RP_G$ 454 at 416. $RP_G$ 454 may send a redirect message to the GW 452 at 418. The redirect message may include a redirect to $OPSF_G$ 458 and/or parameters, such as a sessionID, a returnURL, a nonce, $OID_G$, and/or association handle A for example. The association handle A may be used as an identifier for the association, which may allow for $RP_G$ 454 and $OPSF_G$ 458 to uniquely identify the OpenID login process. The association handle A may also allow the $RP_G$ 454 and $OPSF_G$ 458 to map the authentication flow to the association signing key S in the association and discovery phase of the OpenID protocol. The nonce is a random string value that is generated by the $RP_G$ 454 for this authentication run to distinguish it from other authentication runs that may be occurring in parallel. The nonce may also provide replay protection. The $OID_G$ included in the redirect message may be used as an indication of a parameter to be used for authenticating with the $RP_G$ 454. The $RP_G$ 454 may keep the $OID_G$ and signing key S to directly verify the signed assertion received from the $OP_{loc}$ 450.

At 420, the GW 452 may rewrite the address of the $OPSF_G$ 458 as the address of the $OPSF_S$ in the redirect message. The GW 452 may forward the redirect message to the BA 448 at 422. $OID_G$ may be kept as a parameter in the redirect message forwarded to BA 448 at 422. The BA 448 may perform a modified DNS lookup of $OPSF_S$ to $OP_{loc}$ 450 at 424. The BA 448 may send an authentication request to $OP_{loc}$ 450 at 426. The authentication request may include the $OID_G$ parameter, which may allow $OP_{loc}$ 450 to decide on the correct signing key (e.g., the signing key derived from the shared key $K_G$ for example) to sign the assertion. The authentication request may also include one or more of the other parameters in the redirect message received by BA 448.

User authentication may be performed at 428 between the user 446 and $OP_{loc}$ 450. Based on a valid user authentication at 428, at 430 the $OP_{loc}$ 450 may select the requested authentication parameter for authenticating with $RP_G$ 454. For example, if the authentication parameter requested is $OID_G$ then $OP_{loc}$ 450 may select $K_G$ as the assertion key $K_{asc}$ at 432 for performing authentication with $RP_G$ 454. If, however, the requested parameter is $OID_S$, then $OP_{loc}$ 450 may select $K_S$ as the assertion key $K_{asc}$ at 432. As $OID_G$ has been requested for authentication with $RP_G$ 454 as a parameter in the redirect message at 418, the $OP_{loc}$ 450 may select $K_G$ as the assertion key $K_{asc}$ in FIG. 4. $K_G$ may be the shared key stored at the $OPSF_G$ 458. The $OP_{loc}$ 450 may sign an authentication assertion (e.g., OpenID assertion) with a signing key S, which is derived from the association handle A and the assertion key $K_{asc}$ at 436. At 438, the signed assertion may be sent from $OP_{loc}$ 450 to BA 448. The BA 448 may send the signed assertion, via GW 452, to $RP_G$ 454 at 440. At 442, the $RP_G$ 454 may verify the assertion (e.g., OpenID assertion) using signing key S. The $RP_G$ 454 may indicate to the user 446 (e.g., via GW 452 and/or BA 448) at 444 that the user is logged in to $RP_G$ 454 and may access services.

As illustrated in FIG. 4, to make authentication to $RP_G$ 454 transparent for the BA 448 and/or the user 446, GW 452 may substitute certain data in OpenID protocol messages, such as $OID_G$ for $OID_S$ and/or the address of $OPSF_S$ for $OPSF_G$ 458 for example. In this way, $RP_G$ 454 and/or BA 448 may be able to run an unmodified local OpenID authentication protocol for example.

Using the embodiments described herein, domain separation may be maintained. For example, there may be no contact between $RP_G$ 454 and one of the entities of the source $domain_S$ (e.g., $OPSF_S$). The protocol may rely on GW 452 being able to intercept, read, and/or modify messages between BA 448 and $RP_G$ 454. For example, GW 452 may be a benevolently intended or intentionally benevolent man-in-the-middle for $AUTH_G$. Special measures may be taken if $RP_G$ 454 and BA 448 communicate initially via an encrypted channel (e.g., HTTPS). One possibility may be to share corresponding encryption keys between GW 452 and $RP_G$ 454. The encryption keys may be used by $RP_G$ 454 if it finds that GW 452 is on the route to BA 448 of a GET message for the login page for example. In this way, the BA 448 may be requesting the login page of $RP_G$ 454, via GW 452, using an encrypted connection on which GW 452 may eavesdrop. If it is desired that after authentication, $RP_G$ 454 and BA 448 may communicate privately, without GW 452 being able to eavesdrop on communication, then $RP_G$ 454 and BA 448 may set up a secure channel after successful $AUTH_G$ run, using different keys. In one example, to bind the previous, successful $AUTH_G$ run to the establishment of this later secure channel, a public key of BA 448 may be included in the signed assertion message of $AUTH_G$. This public key may be used by $RP_G$ 454 to encrypt its own public key, or a session encryption key. It may be signed with a digital signature which may be verifiable by BA 448 independently, and may be sent to BA 448. Then $RP_G$ 454 and BA 448 may be in possession of encryption keys, and may be mutually assured of the identity of the other party. Using these encryption keys they may establish a secure channel on which GW 452 may not eavesdrop.

Since GW 452 may modify and/or rewrite at least parts of the messages between BA 448 and $RP_G$ 454, those messages may not be authenticated by either party, which may enable GW 452 to perform malicious attacks. For example, GW 452 may be able to log a user on to another relying party than desired by the user (e.g., by rewriting the RP address). One measure to prevent the GW 452 from performing such malicious communications may be to authenticate the GW 452 to the BA 448 and/or the user device before $AUTH_G$ is executed. Such an authentication may assume that trustworthy gateways may not perform such malicious attacks. GW 452 may also be sufficiently protected from malware to avoid such attacks. If a secure channel between BA 448 and $RP_G$ 454 is established after $AUTH_G$, as described herein, then BA 448 may be assured that it was logged on to the correct relying party. Failure to establish this secure channel may be interpreted as an indication of an attack. Another way to mitigate the described threat may be to digitally sign the relevant messages between BA 448 and $RP_G$ 454. The messages may be signed (e.g., using XML signatures) in a way that excludes the data that may be modified by GW 452.

In group SSO with local OpenID, the OPSF domain may be determined from which to obtain authentication, for an OpenID identifier and/or Relying Party. One way in which this may be performed may be via the $OP_{agg}$ entity. $OP_{agg}$ may acquire a big brother role in identity management. The $OP_{agg}$ may act as a central entity that may know about, and/or may be able to link, one or more OpenID-based accesses of the user in one or more domains. The $OP_{agg}$ may also have direct insight into the trust and/or business relationships between the user and the various OpenID providers. This may be due to the use of the OpenID protocol for example. The embodiments described herein may implement a discovery process of OpenID using the functionality of the $OP_{agg}$. $OP_{agg}$ and/or OPSF functionality may be included in a local OpenID entity inside the UE. The local entity on the device (such as inside a smart card, a Trusted Environment (TrE), and/or a SEE for example) may be able to access the public Internet or other similar networks for communications.

Figure 5:
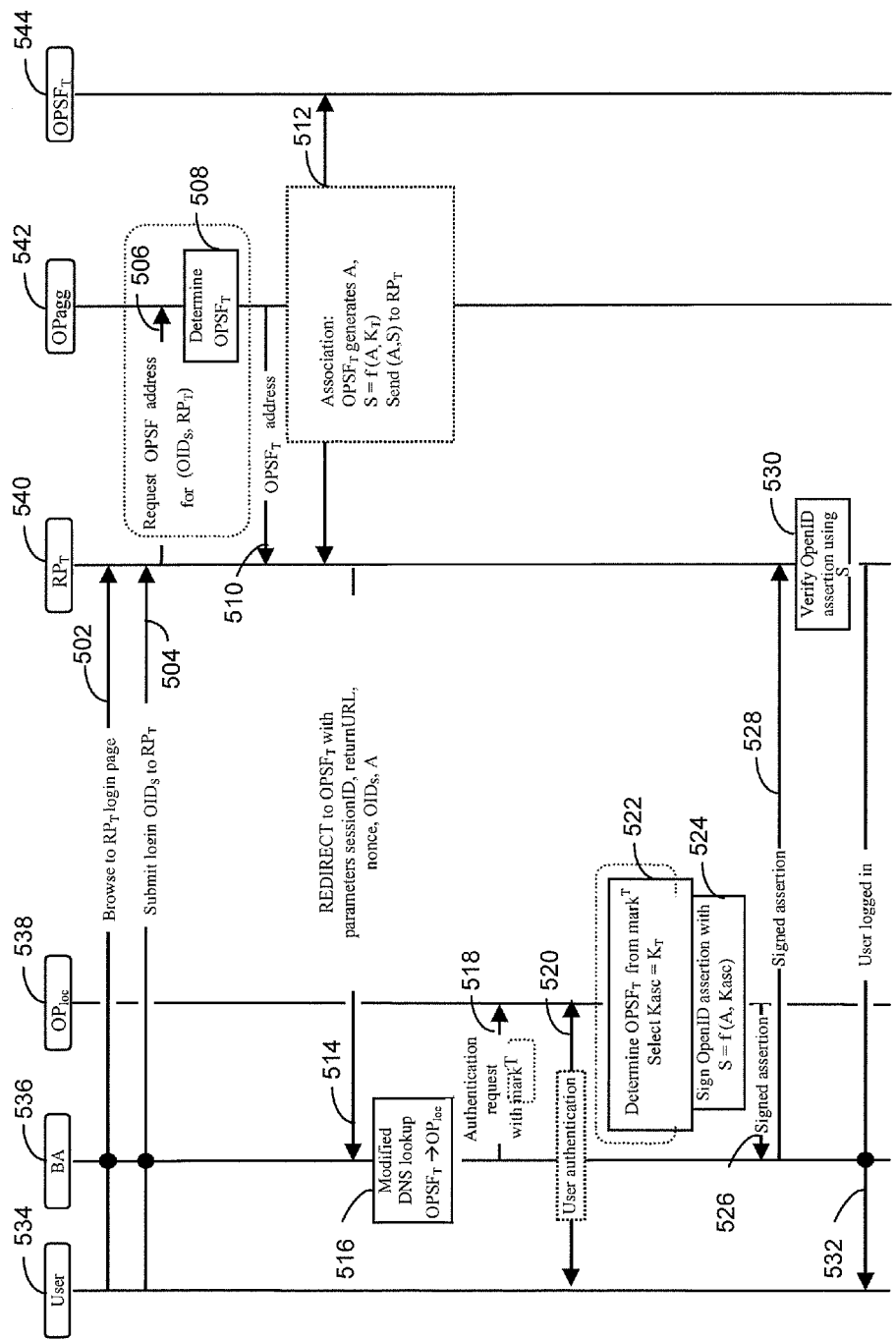
FIG. 5 is another flow diagram illustrating an OpenID authentication protocol.
Figure 6:
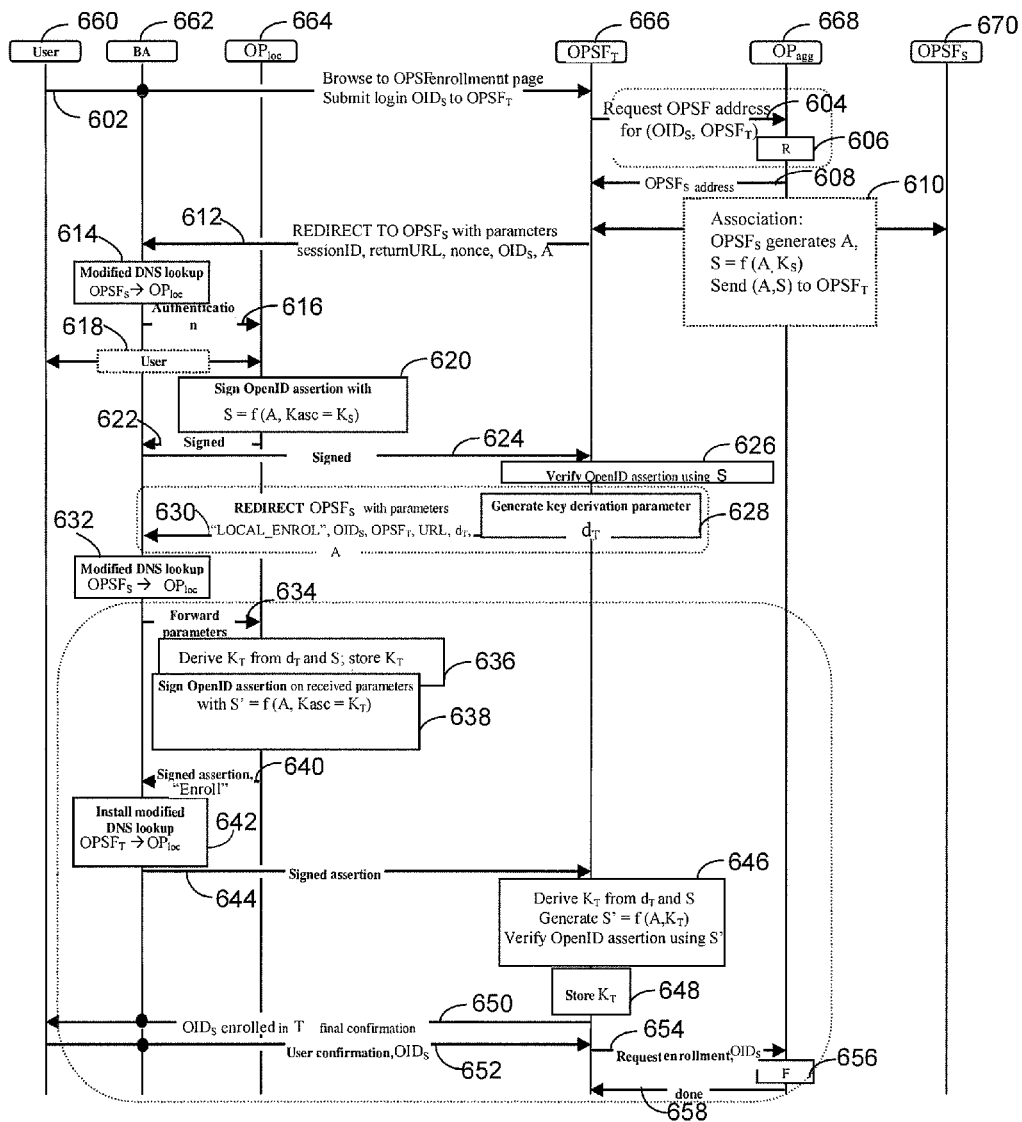
FIG. 6 is another flow diagram illustrating an OpenID enrollment protocol.

FIGS. 5 and 6 illustrate another example embodiment of an authentication flow and enrollment flow, respectively. FIG. 5 is a flow diagram illustrating an $OP_{agg}$-based local OpenID authentication. As illustrated in FIG. 5, authentication of a user 534 and/or the user 534's device to a relying party $RP_T$ 540 may be performed in the target $domain^T$ using an identifier $OID_S$ of the source $domain^S$. At 502, a user 534 may browse to a login page of $RP_T$ 540 of target $domain^T$. The user 534 may browse to the login page via BA 536 for example. At 504, the user 534 may submit login $OID_S$ of the source $domain^S$ to $RP_T$ 540, via BA 536 for example. The $RP_T$ 540 may request the address of $OPSF_T$ 544 from $OP_{agg}$ 542 at 506. The address of $OPSF_T$ 544 may be requested for ($OID_S$, $RP_T$ 540). $OP_{agg}$ 542 may determine $OPSF_T$ address at 508. After enrollment, a mapping of $OID_S$ to the relying party $RP_T$ 540 in the target $domain^T$ may be established at $OP_{agg}$ 542 for example. $OP_{agg}$ 542 may be a general $OP_{agg}$ which serves as a central discovery point. The $OP_{agg}$ 542 may send the address of $OPSF_T$ 544 to $RP_T$ 540 at 510. At 512, the $RP_T$ 540 and $OPSF_T$ 544 may perform association. During association at 512, $OPSF_T$ 544 may generate association handle A and signing key S, where S is derived from association handle A and shared key $K_T$ using a key derivation function. The shared key $K_T$ may be a root key shared between $OPSF_T$ 544 and $OP_{loc}$ 538 for authentication of user 534 using $OP_{loc}$ 538. Thus, the shared key $K_T$ may be a shared secret between source $domain^S$ and target $domain^T$. The $OPSF_T$ 544 may send association handle A and signing key S to $RP_T$ 540 at 512.

$RP_T$ 540 may send a redirect message to BA 536 at 514. The redirect message may include a redirect to $OPSF_T$ 544 with parameters, such as a sessionID, a returnURL, a nonce, the $OID_S$, and/or association handle A for example. BA 536 may perform a DNS lookup at 516 of the $OPSF_T$ 544 address, which may return the $OP_{loc}$ 538 address based on a local mapping of the $OPSF_T$ 544 address to the $OP_{loc}$ 538 address. At 518, the BA 536 may send an authentication request to $OP_{loc}$ 538 at 518. The authentication request may include a $mark^T$. The $mark^T$ may allow $OP_{loc}$ 538 to determine to which domain it should authenticate. For example, the $mark^T$ may indicate which domain key $K_S$ or $K_T$ should be used and/or what domain the user 534's device is in. This mark$^T$ may be the server address in an HTTP GET message submitted from BA 536 to OPSF$_T$ 544 and/or redirected via modified DNS lookup to OP$_{loc}$ 538. For example, the mark$^T$ may be the address of OPSF$_T$ 544. The user 534 may authenticate with OP$_{loc}$ 538 (e.g., by submitting authentication credentials) at 520. OP$_{loc}$ 538 may include the shared secret K$_T$ that is shared with OPSF$_T$ 544. At 522, OP$_{loc}$ 538 may determine OPSF$_T$ 544 from mark$^T$ and/or select the assertion key K$_{asc}$ as K$_T$. The OP$_{loc}$ 538 may sign an assertion message (e.g., OpenID assertion message) using a signature S, which may be derived from a function of association handle A and assertion key K$_{asc}$, which equals K$_T$. The signed assertion message may be sent to BA 536 at 526. The BA 536 may forward the signed assertion message to RP$_T$ 540 at 528. At 530, the RP$_T$ 540 may verify the assertion message using signing key S. At 532, RP$_T$ 540 may indicate to user 534 (e.g., via BA 536) that the user is logged in to RP$_T$ 540 and may access services.

As illustrated in FIG. 5, OP$_{agg}$ 542 may determine OPSF$_T$ 544 based on the information (e.g., OID$_S$ and/or RP$_T$ 540) received from BA 536. The redirect message to BA 536 at 514 may include the OPSF$_T$ 544 address (e.g., URL), as opposed to the OPSF$_S$ address for example, to which OID$_S$ may have been originally enrolled. OPSF$_T$ 544 may be mapped to OP$_{loc}$ 538 in the modified DNS lookup at 516 for example. OP$_{loc}$ 538 may determine the correct key, K$_T$ for the target domain$^T$, to use for authentication based on the received mark$^T$ in the authentication request at 518. The mark$^T$ may be in the format of a URI for OPSF$_T$ 544 for example.

According to different embodiments, OP$_{loc}$ 538 may be a full, wholly functional local OP, or a traditional, network-based source-domain OP. The protocol flow illustrated in FIG. 5, or portions thereof, may be used when the OP$_{loc}$ 538 is a local assertion provider (LAP) of an OpenID protocol, where OPs may be distributed. The protocol flow illustrated in FIG. 5 may be used when the OP$_{loc}$ 538 is a full, wholly functional local OP or a traditional, network-based source-domain OP, such as a source domain OP, for example.

K$_T$ sharing may take place before authentication and/or enrollment. For example, for the distributed case, a key K may be shared between source-domain OPSF$_S$ and the target domain OPSF$_T$. This may be followed by a second, intra-domain K$_T$ sharing between the LAP (e.g., OP$_{loc}$) and source-domain OPSF$_S$. This implementation may address the case where the source and target domains are affiliated domains. In such a case, allowing a differentiated treatment of a particular pair of source and target domain OPSFs, by, e.g., allowing a shared key establishment between such preferred pair(s) of domains may give operators of the proposed group-based SSO operations ways to offer differentiated services to different sets of customers. In another implementation, the K$_T$ may not be shared between the LAP and source-domain OPSF$_S$. A separate shared key may be used between the LAP and source-domain OPSF$_S$, such as K$_{T'}$ for example. For example, the LAP may authenticate to the source OPSF$_S$ using K$_{T'}$, and the source OPSF$_S$ may authenticate the user to the target domain OPSF$_T$ using K$_T$.

An explicit form of enrollment may be used to enroll to the target domain$^T$. One example embodiment of the explicit enrollment is shown in FIG. 6. FIG. 6 is a flow diagram illustrating an OP$_{agg}$-based local OpenID explicit enrollment protocol. As illustrated in FIG. 6, the enrollment of an OID$_S$ of a source domain$^S$ to a target domain$^T$ may be performed in its explicit form. For example, the user 660 may browse to a particular enrollment page to perform enrollment. Enrollment may be used to authenticate the user 660 toward an entity in target domain$^T$ which may be able to distribute data to OP$_{loc}$ 664 and/or OP$_{agg}$ 668 (e.g., general OP$_{agg}$ serving as a central discovery point) so that the conditions for OpenID authentication in target domain$^T$, as described herein, may be satisfied.

To enable enrollment to target domain$^T$, the user 660 may browse to an RP in the target domain$^T$. The user 660 and/or the user 660's device may request OpenID authentication in the source domain$^S$ from the OpenID Provider (OP) of source domain$^S$ toward this enrollment entity. According to the example embodiment illustrated in FIG. 6, the role of the enrollment entity may be implemented by the OPSF$_T$ 666 of target domain$^T$. OPSF$_T$ 666 may behave like a relying party of source domain$^S$ in a first OpenID run for authentication of OID$_S$ and/or OP$_{loc}$ 664. OPSF$_T$ 666 and/or OP$_{loc}$ 664 may perform a key derivation and information distribution procedure, which may result in enrollment. Mediation between the two may involve OPSF$_S$ 670 and association to service groups may be performed by the OP$_{agg}$ 668.

As illustrated in FIG. 6, user 660 may browse, via BA 662 for example, to an OPSF$_T$ 666 enrollment page at 602. The user 660 may submit login information to OPSF$_T$ 666 for accessing services in the target domain$^T$. The login information may include the OpenID identity OID$_S$ that is used for logging on to services in the source domain$^S$. At 604, the OPSF$_T$ 666 may request, from OP$_{agg}$ 668, the OPSF address that corresponds to the OID$_S$ and OPSF$_T$. The OP$_{agg}$ 668 may run procedure R at 606 and return the address of OPSF$_S$ 670 to OPSF$_T$ 666 at 608. The procedure R is a procedure that is run in preparation for enrollment. In one example embodiment, the procedure R may be a database function that is run in preparation for enrollment, and may enable OP$_{agg}$ 668 to perform a database lookup of the OPSF address that corresponds to the pair (OID$_S$, OPSF$_T$ 666). In running the procedure R: 1) it may be determined that the pair (OID$_S$, OPSF$_T$ 666) is an unknown service association, which means that OID$_S$ may not be enrolled in domain$^T$; 2) OPSF$_S$ 670 may be determined separately from OID$_S$; and/or 3) a trust relationship may be decided between OPSF$_S$ 670 and OPSF$_T$ 666 which may allow enrollment (e.g., this trust relationship may be implemented by a lookup of according policies). If all, or a combination of, the above three conditions are satisfied, the OP$_{agg}$ 668 may send the address of OPSF$_S$ 670 to OPSF$_T$ 666 for enrollment of OID$_S$ in domain$^T$. Otherwise OP$_{agg}$ 668 may send an error message to OPSF$_T$ 666, and OID$_S$ may not be able to be enrolled in domain$^T$, at least without satisfying one or more additional conditions for example.

If OPSF$_T$ 666 obtains the address of OPSF$_S$ 670 (e.g., the proper conditions are met for enabling enrollment of OID$_S$ in domain$^T$) then the OPSF$_T$ 666 may perform association with OPSF$_S$ 670 at 610. OPSF$_S$ 670 may generate association handle A and/or signing key S at 610. Signing key S may be derived from a function of A and shared secret K$_S$, which is a pre-established shared secret between OP$_{loc}$ 664 and OPSF$_S$ 670. OPSF$_S$ 670 may send A and S to OPSF$_T$ 666 at 610. At 612, OPSF$_T$ 666 may send a redirect message to BA 662. The redirect message may include a redirect to OPSF$_S$ and/or parameters such as a sessionID, a returnURL, a nonce, the OID$_S$, and/or association handle A for example.

The BA 662 may perform a DNS lookup for the address of the OPSF$_S$ 670, which may be mapped by a local modification to the address to OP$_{loc}$ 664, at 614 for performing user 660 authentication using OP$_{loc}$ 664. At 616, the BA 662 may send an authentication message to OP$_{loc}$ 664. The authentication message may include association handle A, OID$_S$ and/or one or more of the other parameters received in the redirect message from the OPSF$_T$ 666 for example. The user 660 may perform authentication with OP$_{loc}$ 664 at 618. OP$_{loc}$ 664 may sign an assertion (e.g., OpenID assertion) with signing key S, where S is derived from association handle A and assertion key $K_{asc}$. $K_{asc}$ may be equal to the shared secret $K_S$, which is shared with the $OPSF_S$ 670. The $OP_{loc}$ 664 may select the shared secret $K_S$ as the assertion key $K_{asc}$, as the shared secret $K_S$ corresponds to the $OID_S$ request received in the authentication message at 616. $OP_{loc}$ 664 may send the signed assertion to BA 662 at 622. The BA 662 may forward the signed assertion to $OPSF_T$ 666 at 624.

At 626, $OPSF_T$ 666 may verify the assertion using the assertion signing key S, received from $OPSF_S$ 670. $OPSF_T$ 666 may generate a key derivation parameter $d_T$ at 628. Key derivation parameter $d_T$ may be a random number generated in the target domain$^T$ and used as a secret key control parameter between $OP_{loc}$ 664 and $OPSF_T$ 666. $OPSF_T$ 666 may send a redirect message to BA 662 at 630. The redirect message may include a redirect to $OPSF_S$ 670 of the source domain$^S$ and/or parameters, such as a "local enroll" parameter, the $OID_S$, the $OPSF_T$ identifier (e.g., URL), key derivation parameter $d_T$, and/or association handle A. At 632, the BA 662 may perform a modified DNS lookup of $OP_{loc}$ 664 using the address of $OPSF_S$ 670. The BA 662 may forward $d_T$, A, $OID_S$, and/or one or more of the other parameters received at 630 to the $OP_{loc}$ 664 at 634. At 636, $OP_{loc}$ 664 may derive a target domain key $K_T$ from the key derivation parameter $d_T$ and the signing key S. The target domain key $K_T$ may be derived as a shared key between the $OP_{loc}$ 664 and the $OPSF_T$ 666, which may be used for authentication of a user in the target domain$^T$. $OP_{loc}$ 664 may store the derived target domain key $K_T$ for later use (e.g., in authentication).

The $OP_{loc}$ 664 may assign the value of the target domain key $K_T$ to the assertion key $K_{asc}$ for signing assertions in the target domain. $OP_{loc}$ knows to assign the value of $K_T$ to the assertion key $K_{asc}$ based on the $OPSF_T$ URL received in the redirect message and $OID_T$ of the target domain$^T$. The $OP_{loc}$ 664 may derive a signing key S' for the target domain$^T$ from association handle A and assertion key $K_{asc}$. At 638, the $OP_{loc}$ 664 may sign an assertion message (e.g., OpenID assertion message) with signing key S'. After $OP_{loc}$ 664 has generated the signed assertion for authentication toward $OPSF_T$ 666, it may send the signed assertion at 640 to BA 662 for enrollment. The signed assertion may include an enrollment indication parameter (e.g., "Enroll") that indicates to the BA that the DNS lookup should be modified. This parameter may be understood by BA 662 as a command to establish the modified DNS lookup for the target domain$^T$'s $OPSF_T$ 666. This may enable subsequent local OpenID authentication runs transparently for source domain$^S$ and target domain$^T$. At 642, the BA 662 may install a modified DNS lookup of $OPSF_T$ 666 from the address of $OP_{loc}$ 664. At 644, the BA 662 may send the assertion message to $OPSF_T$ 666.

$OPSF_T$ 666 may derive the shared target domain key $K_T$ from $d_T$ and signing key S at 646. The shared key $K_T$ may be used to create a trust relationship between $OP_{loc}$ 664 and $OPSF_T$ 666 and may be shared between the source domain$^S$ and the target domain$^T$. $OPSF_T$ 666 may generate S' at 646 from a function of association handle A and shared key $K_T$. $OPSF_T$ 666 may verify the assertion received at 644 using S'. The $OPSF_T$ 666 may store the shared key $K_T$ of the target domain$^T$ at 648 for later use (e.g., in authentication). At 650, $OPSF_T$ 666 may send, via BA 662 for example, a request for confirmation that the user 660 wishes to enroll $OID_S$ in the target domain$^T$. The user 660 may send, via BA 662 for example, confirmation and/or reply from $OID_S$ to $OPSF_T$ 666 at 652. At 654, the $OPSF_T$ 666 may request enrollment of $OID_S$ from $OP_{agg}$ 668. The $OP_{agg}$ 668 may enroll $OID_S$ in the target domain$^T$ to enable its use to authenticate the user 660 in the target domain$^T$. For example, the $OP_{agg}$ 668 may enroll $OID_S$ using the enrollment finalization function F at 656. The enrollment finalization function F may be a database finalization function that associates $OID_S$ with $OPSF_T$ 666 and/or an $OID_T$ in the target domain$_T$. This may prevent spurious attempts of enrollment for example. After this enrollment procedure, user 660 may be able to authenticate with local OpenID to the associated relying parties in target domain$^T$ using its OpenID identity $OID_S$ from the source domain$^S$. After enrollment is finalized, $OP_{agg}$ 668 may indicate such enrollment to the $OPSF_T$ 666 at 658.

As illustrated in FIG. 6, following the enrollment preparation procedure R at 606 may be a local OpenID run with $OPSF_T$ 666 as relying party (RP). According to an embodiment, the enrollment procedure may start after $OPSF_T$ 666 has verified the assertion with shared signing secret S. It may include a modified local OpenID run, with the addition of a key derivation procedure which may result in the shared key $K_T$ for local OpenID authentication between $OPSF_T$ 666 and $OP_{loc}$ 664. For this, $OPSF_T$ 666 may generate the key derivation parameter $d_T$ at 628 and may send $d_T$ along with the command for enrollment to $OP_{loc}$ 664, in the OpenID redirect message at 630.

The key derivation parameter $d_T$ may be chosen independently by $OPSF_T$ 666. A binding of the shared key $K_T$ to the previous authentication (e.g., OpenID authentication) of $OP_{loc}$ 664 toward $OPSF_T$ 666 may be implemented. This may occur so that $OPSF_T$ 666 obtains assurance that $OP_{loc}$ 664 that is authenticated for enrollment will be able to derive the correct shared key $K_T$. To establish this property, the derivation of $K_T$ may depend in a unique way on both $d_T$ and signing key S. No other party, except $OPSF_S$ 670 for example, may know signing key S, and thus, may not be able to determine $K_T$. Since $OPSF_S$ 670 knows signing key S, it may derive $K_T$ if it learned $d_T$. To prevent this, $OPSF_T$ 666 and $OP_{loc}$ 664 may communicate over an encrypted channel at least in the steps in which $d_T$ may be transmitted.

$OPSF_T$ 666 may use verification of the received signed assertion to determine that enrollment has been performed by the authentic $OP_{loc}$ 664, such as by generation of shared key $K_T$ for example. After this occurs, and/or after optionally requesting final confirmation of enrollment from the user 660 at 650, $OPSF_T$ 666 may trigger the establishment of the service associations for $OID_S$ with $OP_{agg}$ 668. For this, $OP_{agg}$ 668 may run the procedure F at 656. At procedure F, $OP_{agg}$ 668 may generate and/or store the association pairs of $OID_S$ to $RP_T$ ($OID_S$, $RP_T$) for Relying Parties $RP_T$ in domain$^T$. The associations may be determined depending on various policies for example.

According to an example embodiment, the source domain$^S$ described herein may be an OpenID domain of an OpenID provider that is not using the local OpenID, but is instead using a standard OpenID for web-based authentication. For example, an OpenID provider (OP) (e.g., GOOGLE®, YAHOO®, etc.) may not implement local OpenID. When local OpenID is not being implemented by an OP, ingestion may be performed which may be similar to the enrollment and authentication procedures described herein. When performing ingestion (i.e., enrollment and/or authentication using standard OpenID) of an identity from such a standard OpenID domain (e.g., normal domain$^N$) to a local OpenID domain, normal domain$^N$ may run a web-based authentication protocol between a BA and an $OP_N$. This may result in producing an assertion which states that a particular $OID_N$ is authenticated. However, this assertion may provide no assurance that the $OID_N$ is bound in the desired way to a particular $OP_{loc}$. For example, this assertion may provide no assurance that the $OID_N$ is bound to an entity that rests on the same device, or transport layer protocol endpoint, which includes the BA, which has performed the OpenID authentication. A system and/or method to enable binding of authentication toward $OP_N$ to a particular $OP_{loc}$ may be based on establishing a binding between authentication factors. One way to establish this binding may be to wrap the enrollment protocol in a single secure channel session, providing at least authentication of communication partners. The communication partners may act as communication endpoints for example, so that both sides may be assured that they are communicating with one counterpart in the subsequent message exchange.

Figure 7:
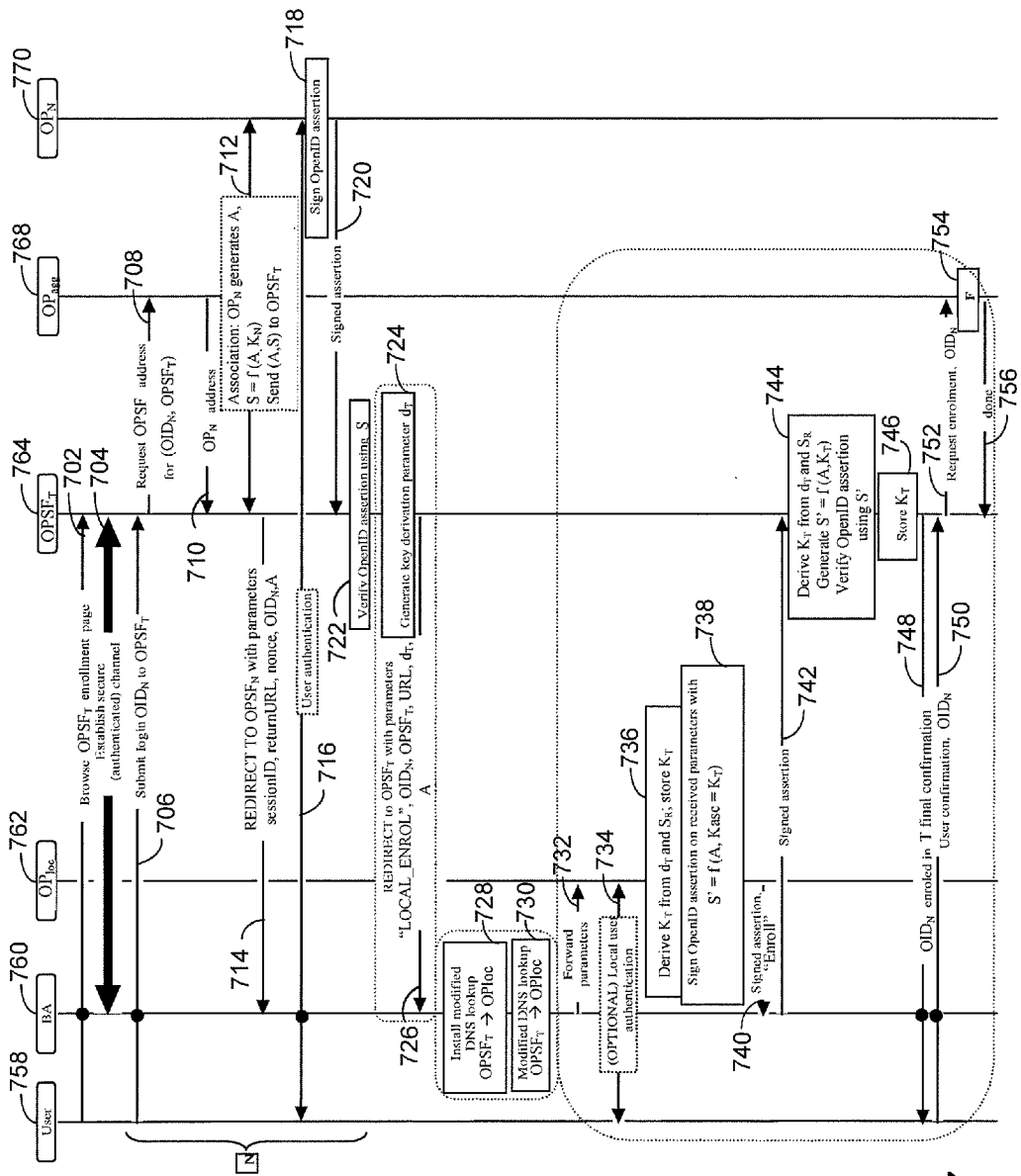
FIG. 7 is a flow diagram illustrating a protocol for performing ingestion from an OpenID domain.

FIG. 7 is a flow diagram illustrating ingestion from an OpenID domain protocol. As illustrated in FIG. 7, a user 758 may browse, via BA 760 for example, to $OPSF_T$ 764 at 702. At 704, BA 760 and $OPSF_T$ 764 may establish a secure authenticated channel for communications. The user 758 may submit, via BA 760 for example, login identifier $OID_N$ for the normal domain$^N$ to $OPSF_T$ 764 at 706. The $OPSF_T$ 764 may request an OPSF address at 708 associated with the pair ($OID_N$, $OPSF_T$ 764) from $OP_{agg}$ 768. At 710, $OP_{agg}$ 768 may send the address (e.g., URL) for the non-local $OP_N$ 770 to $OPSF_T$ 764. $OPSF_T$ 764 may perform an association with $OP_N$ 770 at 712. $OP_N$ 770 may generate association handle A and signing key S, where signing key S is derived from association handle A and $K_N$, such as by using a key derivation function for example. $K_N$ may be a derived key of the domain$^N$ or it may be generated randomly by the normal domain$^N$ $OP_N$ 770. $K_N$ may be generated by the $OP_N$ 770 and shared between $OP_N$ 770 and $OPSF_T$ 764. At 712, $OP_N$ 770 may send association handle A and signing key S to $OPSF_T$ 764.

$OPSF_T$ 764 may send a redirect message at 714 to BA 760. The redirect message may include a redirect to $OPSF_N$ in the normal domain$^N$ and/or additional parameters, such as a sessionID, a returnURL, a nonce, $OID_N$, and/or association handle A for example. At 716, user 758 may perform authentication, via BA 760 for example, with $OP_N$ 770. For example, the user 758 may provide authentication credentials to $OP_N$ 770. The $OP_N$ 770 may sign an assertion message (e.g., OpenID assertion message) at 718 using signing key S and may send the signed assertion message to $OPSF_T$ 764 at 720. At 722, the $OPSF_T$ 764 may verify the assertion using the signing key S received from $OP_N$ 770 at 712.

The $OPSF_T$ 764 may generate a key derivation parameter $d_T$ for the target domain$^T$ at 724. Key derivation parameter $d_T$ may be a number (e.g., random number) known to the $OPSF_T$ 764 and which may be shared with $OP_{loc}$ 762 to derive a shared secret for establishing secure communications between the $OPSF_T$ 764 and the $OP_{loc}$ 762. At 726, $OPSF_T$ 764 may send a redirect message to BA 760. The redirect message may indicate the use of local enrollment using $OP_{loc}$ 762. Additionally, the redirect message may include $OID_N$, $OPSF_T$ identity (e.g., URL), key derivation parameter $d_T$, and/or association handle A for example. BA 760 may install a modified DNS lookup of $OP_{loc}$ 762 from the $OPSF_T$ 764 identifier at 730. BA 760 may forward the received parameters at 732 to $OP_{loc}$ 762. At 734, the user 758 may, optionally, perform a local user authentication with $OP_{loc}$ 762. The $OP_{loc}$ 762 may derive $K_T$ from $d_T$ and root secret $S_R$ at 736. $OPSF_T$ 764 and the $OP_{loc}$ 762 may share a pre-established root secret $S_R$ which may allow $OPSF_T$ 764 to authenticate $OP_{loc}$ 762 as a genuine local OP. This authentication may be delegated from $OPSF_T$ 764 to a trusted third party. $OP_{loc}$ 762 may store $K_T$ for later use at 736. $OP_{loc}$ 762 may generate signing key S' from association handle A and assertion key $K_{asc}$. Assertion key $K_{asc}$ may be assigned the value of shared key $K_T$ of the target domain$^T$ based on the $OPSF_T$ identifier received in the redirect message from $OPSF_T$ 764. At 738, $OP_{loc}$ 762 may sign the assertion (e.g., OpenID assertion) with signing key S'.

At 740, $OP_{loc}$ 762 may send a signed assertion message to BA 760 with a parameter indicating enrollment. The BA 760 may forward the signed assertion at 742 to $OPSF_T$ 764. The $OPSF_T$ 764 may derive the shared key $K_T$ of the target domain$^T$ from target derivation key $d_T$ and the pre-established root secret $S_R$ at 744. $OPSF_T$ 764 may also generate signing key S' from association handle A and shared key $K_T$. $OPSF_T$ 764 may verify the received assertion using signing key S'. $OPSF_T$ 764 may store $K_T$ at 746. At 748, $OPSF_T$ 764 may request confirmation that the user 758 wants $OID_N$ enrolled in target domain$^T$. The user 758 may provide such confirmation at 750 to $OPSF_T$ 764. The request for confirmation and/or confirmation from the user 758 may be sent via BA 760 for example. $OPSF_T$ 764 may send a request for enrollment of $OID_N$ to $OP_{agg}$ 768 at 752. For finalization of enrollment, $OP_{agg}$ 768 may run an enrollment finalization procedure F at 754. At procedure F, $OP_{agg}$ 768 may generate and/or store the association pair ($OID_N$, $OPSF_T$ 764). This may prevent spurious attempts of enrollment. After this enrollment procedure, enrollment may be complete at 756 and user 758 may be able to authenticate with local OpenID to the associated relying parties in target domain$^T$ using its OpenID identity $OID_N$.

The local enrollment preparation function R at $OP_{agg}$ 768 may be performed in OpenID discovery, as shown in FIG. 6 for example. The enrollment preparation function R is described herein and may be implemented in the embodiment illustrated in FIG. 7, however, the marking for enrollment preparation function R is not shown in FIG. 7. It will be understood that FIG. 7 may be implemented using OpenID protocol authentication, so additional OpenID protocol authentication steps may be implemented which have also been omitted from FIG. 7. The local enrollment finalization procedure F at $OP_{agg}$ 768 is the same, or similar, to the enrollment finalization procedure illustrated in FIG. 6, with $OPSF_S$ 670 being replaced by $OP_N$ 770, and $OID_S$ being replaced by $OID_N$. The bracket marked with N indicates a part of the ingestion protocol which may be an OpenID authentication run.

In the embodiment illustrated in FIG. 7, the redirect message issued by $OPSF_T$ 764 at 726 (e.g., after verification of the first OpenID assertion) may point to $OPSF_T$ 764. This may allow accessing the local OP 762 via modified DNS lookup at 728. The $OP_N$ 770 address may not be used here, since no modified DNS lookup may be established for the OP. Installation of the modified DNS lookup for the domain may be installed after receiving the redirect message to from $OPSF_T$ 764 at 726. This may occur so that the lookup of $OP_{loc}$ 762 may succeed.

The cryptographic dependence of the derived shared key $K_T$ on OpenID protocol run may be kept in the key derivation process. This may allow later proof by $OPSF_T$ 764 that it has performed ingestion correctly (e.g., bound it to OpenID authentication with $OP_N$ 770). To strengthen this kind of assertion, binding to the establishment of the secure channel may be inserted in the generation of $d_T$. For example, a hash value of the last packet in the establishment of a TLS channel may be included in $d_T$ cryptographically. According to an example embodiment, such channel binding may be performed as illustrated in standards document numbers 5056 and 5929 published by the Internet Engineering Task Force (IETF) Request for Comments. These standards documents illustrate the extraction of a key from an established TLS tunnel, which may be implemented in the manner described herein.

The embodiments illustrated in FIG. 7 may enable the function of $OP_{agg}$ 768 to perform the preparation for enrollment procedure R and/or the discovery of $OPSF_T$ 764 in subsequent authentications. With OpenID provider(s) $OP_N$ 770, the discovery function may be integrated into their web domain, and they may not be enabled and/or willing to perform these functions for local OpenID authentication in the target domain$^T$. The use of advanced discovery functions using an eXtensible Resource Descriptor Sequence (XRDS) may be performed to resolve this issue. XRDS is an XML-format used to provide and describe metadata for a Web resource (e.g., a URL) and/or services which are available at the resource (e.g., URL). The issue may disappear in special cases, for example when the relying parties in the target domain$^T$ are able to perform the discovery of $OPSF_T$ 764 themselves.

In the ingestion protocol, the signed assertion from $OP_{loc}$ 762 may include, apart from the enroll command to $OPSF_T$ 764, a unique identifier of the $OP_{loc}$ 762 on the UE. This may be useful in cases where $OP_{loc}$ 762 is included in a physically separate, and possibly removable, SEE, such as a smart card for example.

The root secret $S_R$ may be an individual secret for each $OP_{loc}$ and/or the transferred unique identifier may enable $OPSF_T$ 764 to find the correct root secret in its local database. This may enable $OPSF_T$ 764 to condition enrollment on the correspondence of $OID_N$ and/or the individual identity of $OP_{loc}$ 762, so that at least one $OID_N$ may use at least one designated $OP_{loc}$ 762 with $OPSF_T$ 764 as an identity provider.

After successful ingestion, the authentication in target domain$^T$ may be performed. In another implementation of ingestion, a local authentication of the user via an added factor may be performed as part of the ingestion (e.g. in the step after the receipt of the authentication request by $OP_{loc}$ 762). The $OP_{loc}$ 762 may communicate with a Local Authentication Agent (LAA) for this via a secure channel. LAA may perform user authentication with the desired strength and/or enroll user authentication credentials (e.g., biometric data). The ingestion to the target domain may be directly performed via the LAA, without involving an $OP_N$ for example.

One example embodiment may include the use of an electronic identity document (eID). For example, the eID may include a German Neuer Personalausweis, which is an identity card equipped with a contactless smart card. A baseline architecture for performing local OpenID ingestion and/or authentication architecture involving such an eID card is described herein.

Figure 8:
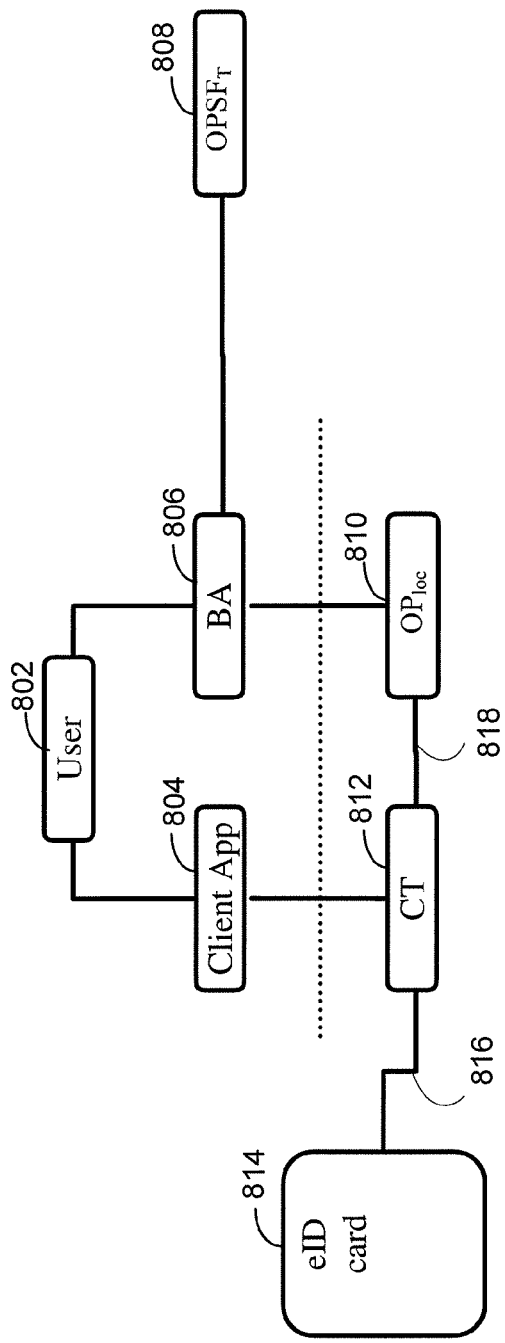
FIG. 8 is a diagram illustrating ingestion using an eID card.

FIG. 8 is a diagram illustrating ingestion with an eID card 814. eID card 814 and card terminal (CT) 812 may communicate via a secure protocol, such as a secure password authenticated connection establishment (PACE) protocol for example, over a contactless link at 816. PACE is a protocol developed for the eID card and may be standardized for various kinds of electronic government ID and travel documents. The $OP_{loc}$ 810 may act as a service which requests authentic user information (e.g., birth date (age verification), registered address, nationality, gender, etc.). The $OP_{loc}$ 810 may receive user 802 information and/or $OPSF_T$ 808 information via BA 806. CT 812 may receive user information via client application 804. $OP_{loc}$ 810 may be equipped with an authorization certificate for requesting user authentication. The authorization ticket's deployment may be under control by accredited entities for example. The authorization certificate may be communicated to CT 812 at 818. In one embodiment, the authorization certificate may be communicated to CT 812 together with the request for the desired data. The user 802 may authorize release of the data to $OP_{loc}$ 810 by entering the user 802's PIN. $OP_{loc}$ 810 may verify the authenticity of the received personal data. This may add authentication factors, such as possession of a particular eID card 814 and/or knowledge of its PIN to the local OpenID enrollment process. It may allow policy decisions such as age verification, which may be taken locally by $OP_{loc}$ 810 and/or at $OPSF_T$ 808. $OP_{loc}$ 810 may embed the pertinent data in the signed assertion for example. $OP_{loc}$ 810 and CT 812 may communicate via a client-server protocol over some secure channel at 818, such as HTTPS for example. According to another embodiment, CT 812 and $OP_{loc}$ 810 may be co-located on the same secure element (e.g., smart card).

In the deployment of modern Web services, in particular mobile and/or social services, a user registration may involve some form of device binding. For example, in a car sharing, mobile, and/or social service, a mobile user may provide their location and/or planned destination data via their mobile device and seek for car sharing opportunities via an application locally installed on their device. Car sharing and/or other social services may have some security requirements since users may incur potential risks by the service-mediated interaction with other users. As a result, accountability may be ensured, and/or service charging may be enabled, by binding the Web service registration to the mobile phone number (e.g., IMSI) of the user (which may be legally, personally registered, such as in the European Union for example), and thereby to the device on which both the service application and/or the SIM card containing the mobile phone number (e.g., IMSI) reside at the time of registration. This combined registration and device binding may use a secondary channel with some security properties, which may have an assured endpoint on the device. According to an example embodiment, short message service (SMS) may be used for the secondary channel. For example, a code may be sent by SMS to the phone number the user previously entered into a registration form. The user may have to type this code into the mobile application to enable service registration.

The use of a secondary channel as described above may offer little protection against receiving the code on someone else's phone if an attacker has access, even if temporary, to the phone to retrieve the code. In this case, the attacker may be able to register to the service under the name of the legitimate phone's owner. OpenID identity ingestion with local OP, as described herein for example, may enable construction of a more convenient, seamless, and secure service registration procedure, which may use a dedicated, secondary channel (e.g., SMS, or another suitable channel to enable the device binding with the desired security properties).

Figure 9:
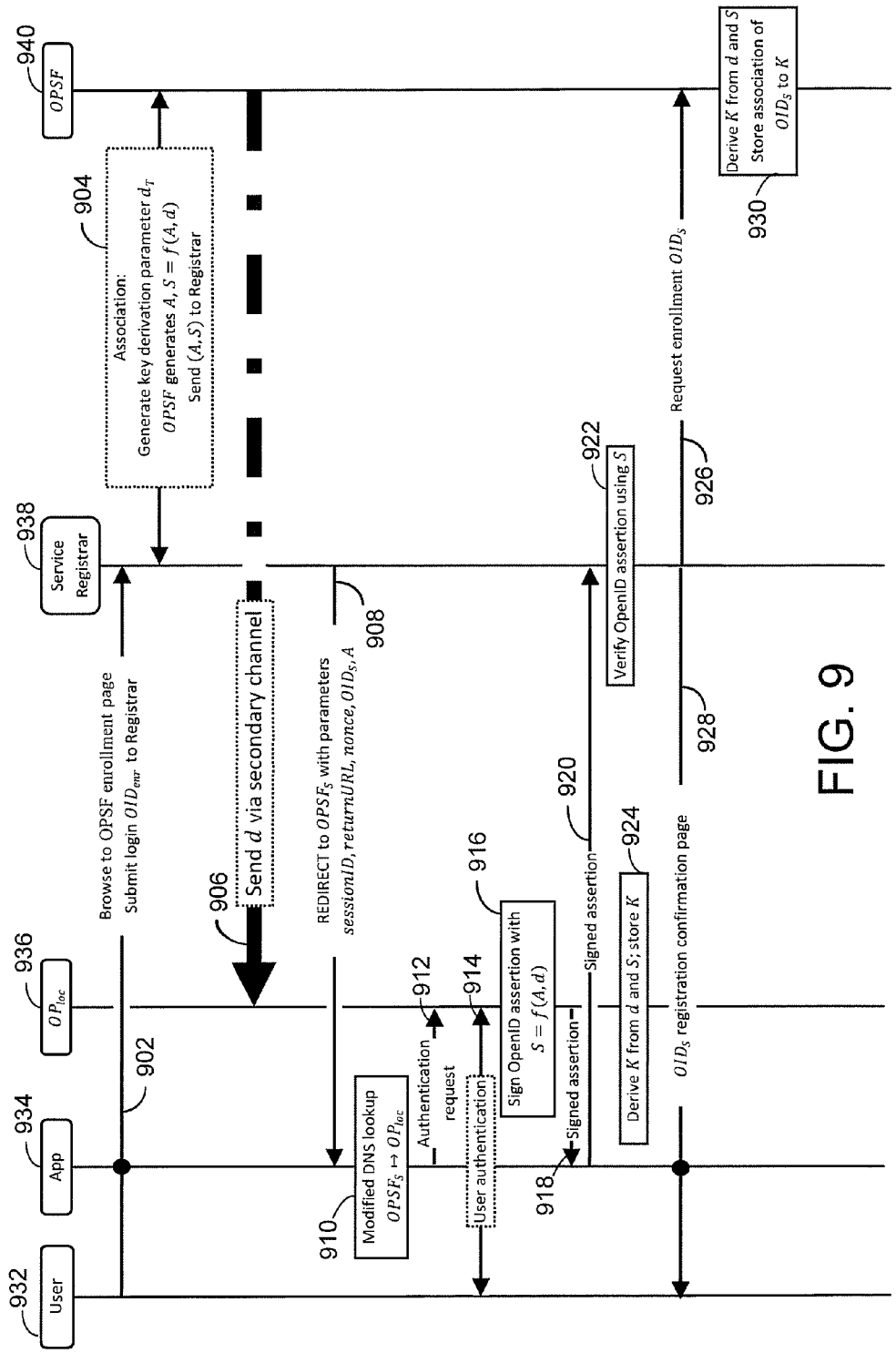
FIG. 9 is a flow diagram illustrating a service registration with device binding using a secondary channel.

FIG. 9 is a flow diagram illustrating a service registration with device binding using a secondary channel. The embodiments illustrated in FIG. 9 may utilize a service registrar 938 and a secondary channel for secure communication between the $OP_{loc}$ 936 and the OPSF 940. OPSF 940 may be a general OPSF or a source domain$^S$ $OPSF_S$, for example, as FIG. 9 does not illustrate a transition from one OpenID domain to another. As illustrated in FIG. 9, at 902, a user may browse to an enrollment page of OPSF 940 and may submit an enrollment login identifier $OID_{enr}$ to the service registrar 938. The login identifier may be submitted via the application 934 for example. At 904, the service registrar 938 may perform an association with the OPSF 940. During association, a key derivation parameter $d_T$ for the target domain may be generated. OPSF 940 may generate association handle A and signing key S, where signing key S is derived from association handle A and key derivation parameter $d_T$. Association handle A and signing key S may be sent from OPSF 940 to service registrar 938 at 904. OPSF 940 may also send key derivation parameter $d_T$ to $OP_{loc}$ 936 via a secondary channel (e.g., SMS) at 906. The shared key derivation parameter $d_T$ may be sent via the secondary channel with defined security properties to the $OP_{loc}$ 936 on the device which includes the application 934 which issued the authentication and/or registration request.

At 908, the service registrar 938 may send a redirect message to the application 934. The redirect message may include a redirect to $OPSF_S$ and/or parameters, such as the sessionID, the return URL, a nonce, $OID_S$, and/or association handle A. At 910, application 934 may perform a modified DNS lookup of the address of $OPSF_S$ to determine the address of $OP_{loc}$ 936. The application 934 may send an authentication request to $OP_{loc}$ 936 at 912. The authentication request may include the information received in the redirect request from the service registrar 938, or a combination of the parameters therein for example. The user 932 may perform authentication at the $OP_{loc}$ 936 at 914. For example, the user 932 may provide authentication credentials which may be used for local authentication on the user device. At 916, the $OP_{loc}$ 936 may sign the assertion (e.g., OpenID assertion) with a signing key S. Signing key S may be derived at the $OP_{loc}$ 936 from a function of association handle A and key derivation parameter $d_T$ received via the secondary channel. The signed assertion may be sent from $OP_{loc}$ 936 to application 934 at 918. The application 934 may forward the signed assertion at 920 to the service registrar 938.

The service registrar 938 may verify the assertion (e.g., OpenID assertion) at 922 using signing key S received from OPSF 940. At 924, the $OP_{loc}$ 936 may derive a shared key K from key derivation parameter $d_T$ and signing key S and store the key K on the device. The key K may be shared with OPSF 940 to create a trusted relationship. The service registrar 938 may request enrollment of the OpenID identifier $OID_S$ for the source domain$^S$ with the OPSF 940 of the target domain$^T$ at 926. At 928, the service registrar 938 may send registration confirmation of $OID_S$ in the target domain$^T$ to the user 932, such as via the application 934 for example. The OPSF 940 may derive shared key K from key derivation parameter $d_T$ and signing key S at 930. The OPSF 940 may store the association of the OpenID identifier $OID_S$ for the source domain with shared key K.

A precondition to the local-OP-based service registration may include a download and/or installation of the service application 934 to the device of user 932. Another precondition may include the presence of the $OP_{loc}$ 936 on the device. The $OP_{loc}$ 936 may be installed along with the application 934 (e.g., from the same download source, service registrar, or mobile application market) or it may be pre-installed with the device, or the UICC for example. The $OP_{loc}$ 936 may or may not have a pre-established trust relationship (e.g., a shared secret key) with a dedicated OPSF for service registration and authentication for example.

Upon first use of the service (e.g., by the user 932's first activation of the application 934) the user 932 may be asked to register to the service. This may be enabled in various ways. For example, the user 932 may press a button (e.g., a button entitled 'register using OpenID') which, after being pressed by the user 932, may trigger the application 934 to submit a generic OpenID enrollment identifier $OID_{enr}$ which may indicate to the service registrar 938 that the application 934 and user 932 may be requesting registration. In another example, the registration and/or authentication may be unified in a single Web page of the service registrar 938. Service registration may be completely seamless, and may not be discerned (e.g., by the user 932) from local OpenID authentication. For example, the user 932 may just press a button (e.g., a 'Login' button) and the registration procedure may be initiated autonomously by the service registrar 938 and/or OPSF 940. In another example, the service registrar 938 may make policy decisions regarding those OpenID identifiers that are included in a registration process. This may be useful for forced re-registration (e.g., for security reasons).

As illustrated in FIG. 9, at 904 the service registrar 938 may establish an OpenID association with the OPSF 940. At some point during this association, a key derivation parameter $d_T$ may be generated. How and by which entity $d_T$ is generated, and sent to the device via the secondary channel, may depend on implementation, trust relationships, and/or separation of duties. For example, $d_T$ may be generated by OPSF 940. Alternatively, $d_T$ may be generated by the service registrar 938 and sent to OPSF 940 in the association request. Addressing information for the secondary channel may, for example, be a number associated with the mobile phone (e.g., IMSI), and/or may be submitted by the user via the registration page.

To bind registration to the ongoing OpenID authentication run, the association signing key S may depend on the derivation parameter $d_T$ (e.g., $S=f(A,d_T)$). In another example, $d_T$ may be the same as the association signing key S. Also, the way in which $d_T$ reaches $OP_{loc}$ 936 on the device may be implementation-dependent. Examples may include manual user input, or a solution by which the service application 934, and/or $OP_{loc}$ 936, accesses the secondary channel (e.g., using SIM Toolkit functions).

In the local OpenID authentication protocol flow illustrated in FIG. 9, which may include local user authentication for example, the derived signing key S may be used to sign and/or verify the OpenID assertion. After successful authentication, the user 932 may be registered by creating a registered shared key K from key derivation parameter $d_T$ locally at the OPSF 940 and $OP_{loc}$ 936, and associating it with the registered OpenID identifier $OID_S$ for the service in question. In effect, the protocol flow illustrated in FIG. 9 may be used to ensure that the registered OpenID identifier is used by a service application 934 for local OpenID authentication using $OP_{loc}$ 936, which may both reside on the same device on which the secondary channel terminates.

According to an example embodiment, an application of OpenID federation may be granting access to a corporate security domain, using an existing user OpenID identity for example. Such a security domain may be an intranet or a virtual private network (VPN) for example, which may be protected by an Internet gateway server. The Internet gateway server may be different than the physical network access gateway described herein. Enabling the use of the corporate security domain with a user's existing OpenID identity, users may be able to bring their own private devices into the corporate domain and use them for work services or other services in the corporate domain without independently registering another identity. The use of the gateway server in a corporate security domain is merely one example for implementation of the gateway server, as it will be understood that the gateway server and existing OpenID identities may be used in various other implementations.

The use of a protected local OP, such as in an SEE or a smart card for example, may be advantageous to maintain certain security properties for the protection of the corporate domain. In one example, users may be authenticated via multiple channels during enrollment (e.g., by sending of a PIN for activation of the $OP_{loc}$ for corporate domain access via ordinary mail). Cloning of corporate access accounts may be prevented. A security property of many available physical access tokens may be used, such as secure USB sticks for example. Local OpenID may be based on standard authentication and application protocol (e.g., HTTP(S)).

In order to implement and use the $OP_{loc}$ in an existing domain, such as the corporate security domain for example, the local OpenID ingestion from the OpenID domain may be used as described herein. The ingestion process described herein may utilize a two-factor authentication. For example, one factor may include possession of $OP_{loc}$, while the other factor may include knowledge of OpenID user authentication credentials. According to an example embodiment, $OP_{loc}$ may be embodied in a smart card. The smart card may be shipped to the designated user's physical address. The user may install the smart card on his device (e.g., smart phone). The user may browse to the corporate security gateway's page and/or submit the user's OpenID identity as login. The security gateway may decide that this user's $OP_{loc}$ is not yet enrolled. The security gateway may run an ingestion protocol, such as the ingestion protocol illustrated in FIG. 7 for example. A software set may be downloaded to the device to enable the client side actions of the protocol, such as establishment of the modified DNS lookups for example.

The OpenID authentication may be performed with a selected OpenID provider site (e.g., GOOGLE®, YAHOO®, etc.). In a protocol run and/or in subsequent authentication, the security gateway may incorporate the role of $OP_{agg}$ (which may be used to resolve the discovery problem). According to another embodiment, $OPSF_T$ of the target domain$^T$ may stay separate from the corporate gateway. For example, $OPSF_T$ may be an authentication provider service for at least one corporate security gateway.

Subsequent authentications may be performed as described herein using an enrolled identity. The user authentication may be transparent (e.g., without local user authentication) or implemented with any form of local user authentication available on the device being used as an additional authentication factor. Such factors of local authentication (e.g., biometric authentication) may be enrolled in the local authentication of the user in the ingestion protocol.

According to an example embodiment that implements the corporate gateway, the corporate gateway may incorporate the task of establishing a secure channel (e.g. VPN) between a device and a corporate network. While the corporate network is used in this example embodiment, it will be understood that various other types of networks may be used in a similar manner. The secure channel between the device and the corporate network may be bound to a local OpenID authentication, such as is illustrated in the enrollment of a secure channel in FIG. 7 for example. There may be a number of ways to establish a secure channel between a device and a network (e.g., a corporate network), some of which may include the use of a VPN.

According to one example embodiment, local OpenID may be implemented via a VPN secure tunnel. In this example embodiment, the user may start a VPN client, which may build a secure tunnel to the corporate VPN gateway but may stay in a quarantine mode (e.g., where the VPN client may not get connectivity to the VPN). After authentication, such as via the local OP for example, full VPN connectivity may be enabled. The local OpenID may be implemented via the VPN secure channel with little or no modification of the VPN client. The VPN client, which may be included as the corporate gateway of the enrollment phase, may perform the same, or similar, initial behavior as in the establishment of a secure channel.

According to another example embodiment, VPN connection may be established using the local OpenID authentication. In this example embodiment, local OP-based authentication may be performed toward a VPN gateway in the Web. In the OpenID authentication, an application service specific, secret, shared key may be negotiated with the $OPSF_T$ of the target domain$^T$. That is, the application service specific, secret, shared key may be used to bind the authentication session to the later establishment of the secure tunnel. Based on this, the VPN tunnel may be established. Establishing the VPN connection using the local OpenID authentication may implement a hand-down and/or use of a secret key from the local OP to the VPN client. According to an example embodiment, this hand-down and/or use of the secret key may be similar to the GBA-ME illustrated in Technical Specification (TS) number 33.220 of the 3$^{rd}$ Generation Partnership Project (3GPP) specifications.

Described herein are embodiments for establishing a secure channel between one or more devices and a network. According to an embodiment, the local OpenID may be implemented via a VPN secure tunnel and a VPN connection may be established using the local OpenID authentication. The implementation of the VPN secure tunnel and the establishment of the VPN connection may both be incorporated into the same protocol for example.

Figure 10:
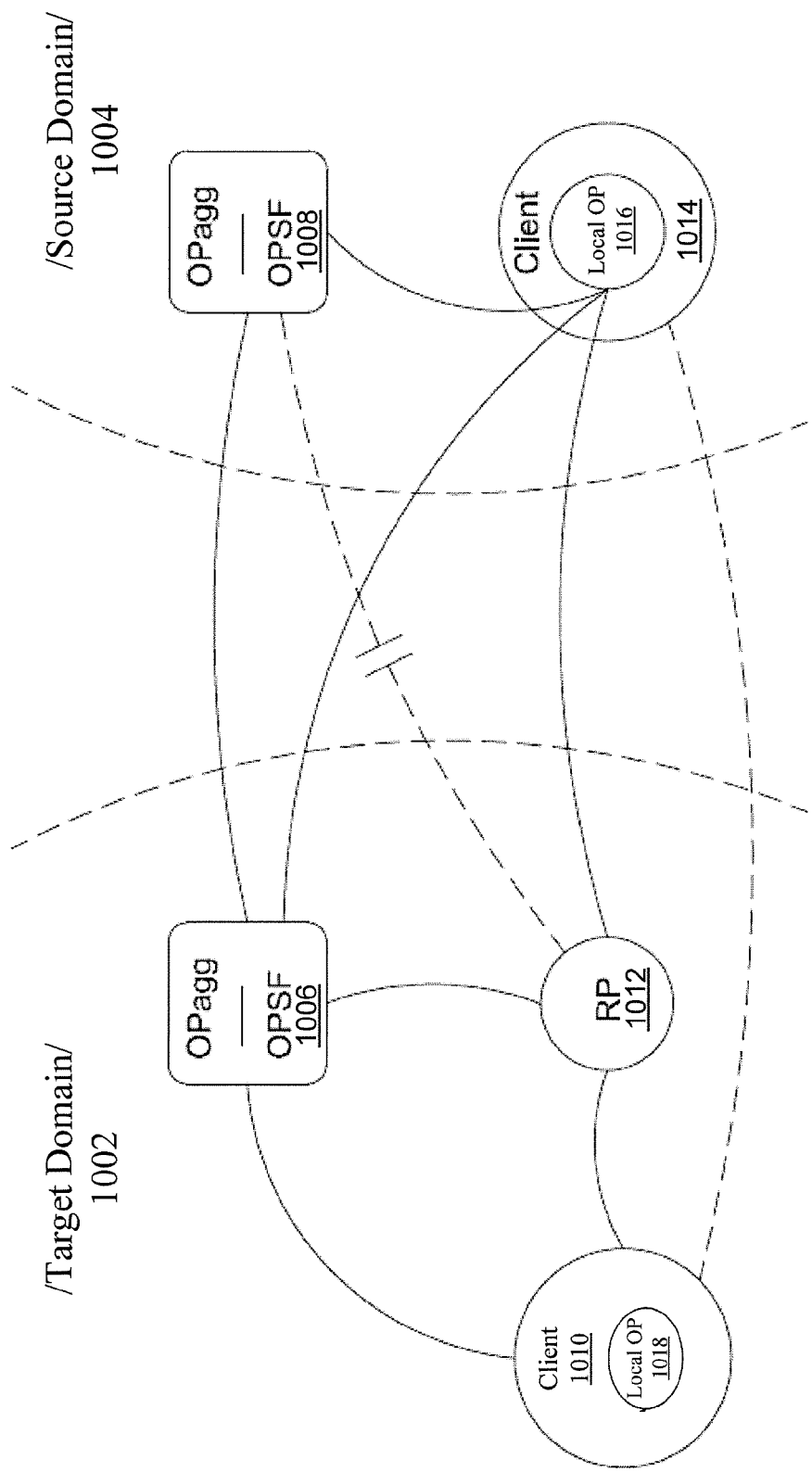
FIG. 10 is a diagram illustrating a client capable of accessing services in a target domain by using a local OpenID provider (local OP) from another client in the target domain.

According to an example embodiment, OpenID federation may involve multiple clients. One example embodiment of a federated OP involving multiple clients is illustrated in FIG. 10. FIG. 10 is a diagram illustrating a client 1014 of source domain 1004 that obtains SSO to a target domain 1002 by using local OP function 1016 and/or a credential from another client 1010 in the target domain 1002. As illustrated in FIG. 10, a device, such as client 1014 for example, may take advantage of an OP relationship that already exists between the client 1014 and another device to obtain service from an RP 1012. The other device may be client 1010 and/or OPSF 1006 in target domain 1002 for example. In one implementation, the client 1014 may have a link (e.g., proprietary link) to client 1010. Client 1010 may have greater capability to authenticate the user of client 1014 than client 1014 itself. For example, client 1010 may have greater capability to authenticate the user using its own federated OpenID capability and existing assertions. Client 1010 and/or its local OP 1018 (or other local assertion provider for example) may be able to vouch for the user of client 1014, and/or client 1014 itself, better than if the client 1014 and/or its own local OP 1016 vouched for its user or itself (e.g., via $OP_{agg}$/OPSF 1008 in the source domain 1004).

The additional client 1010 may be implemented using similar features as described herein with regard to the implementation of a single client, such as client 1014 for example. FIG. 10 illustrates the incorporation of a different client 1010 in the target domain 1002 via the source client 1014. The local OP 1016 on client 1014 in the source domain 1004 may differ in some respects to local OP 1018 on client 1010 of the target domain 1002 and may be captured in the generalized mapping. Hence, the following type of mapping or association may be performed:

$$\{ClientIDs, OIDs, ClientID_T, OID_T, RP\} \rightarrow \{OPSF\} \quad \text{Equation 3}$$

The mapping of Equation 3 may associate a Quintuplet of two ClientIDs (source and target), two OpenID Identifiers (source and target), and/or Relying Party to one or more OPSFs which may be able to authenticate the user for the domain/group to which RP belongs.

In local OpenID, this mapping may be implemented in the discovery phase. For example, the entity $OP_{agg}$, and/or a meta-entity on top of a set of $OP_{agg}$s, may store this mapping table. The association table may be global. This may be due to the usage of global URIs as identifiers in OpenID for example. The mapping may be organized in various ways. For example, it may map {(ClientID$_S$, OID$_S$, Client ID$_T$, OID$_T$, RP)} to {OPSF$_X$}. Such a mapping may support the service grouping. The support for the user subscription to a group may be enforced by OPSF$_X$, as described herein for example.

With regard to federation, a user may desire to roam between service groups in which the source domain$^S$ and target domain$^T$ may be supported. In the notation described above, this means that associations $$\text{ClientIDs} \times \text{OIDs} \times \text{ClientID}_T \times \text{OID}_T \times \{RP_T\} \rightarrow \text{OPSF}_T \quad \text{Equation 4}$$

may be established for a user coming from a domain$^S$ where the user has a client with ClientID$_S$, OpenID Identifier OID$_S$, which the user may want to use transparently in domain$^T$, but in a way that may use the capabilities or existing OpenID connections enabled by ClientID$_T$, and/or OpenID Identifier OID$_T$ toward services belonging to the domain/group$^T$. Discovery and/or enrollment may be dependent upon the examination of these mappings/associations. It will be understood that embodiments similar to those described herein with regard to implementations for a single client may be used for multiple client implementations.

Figure 11:
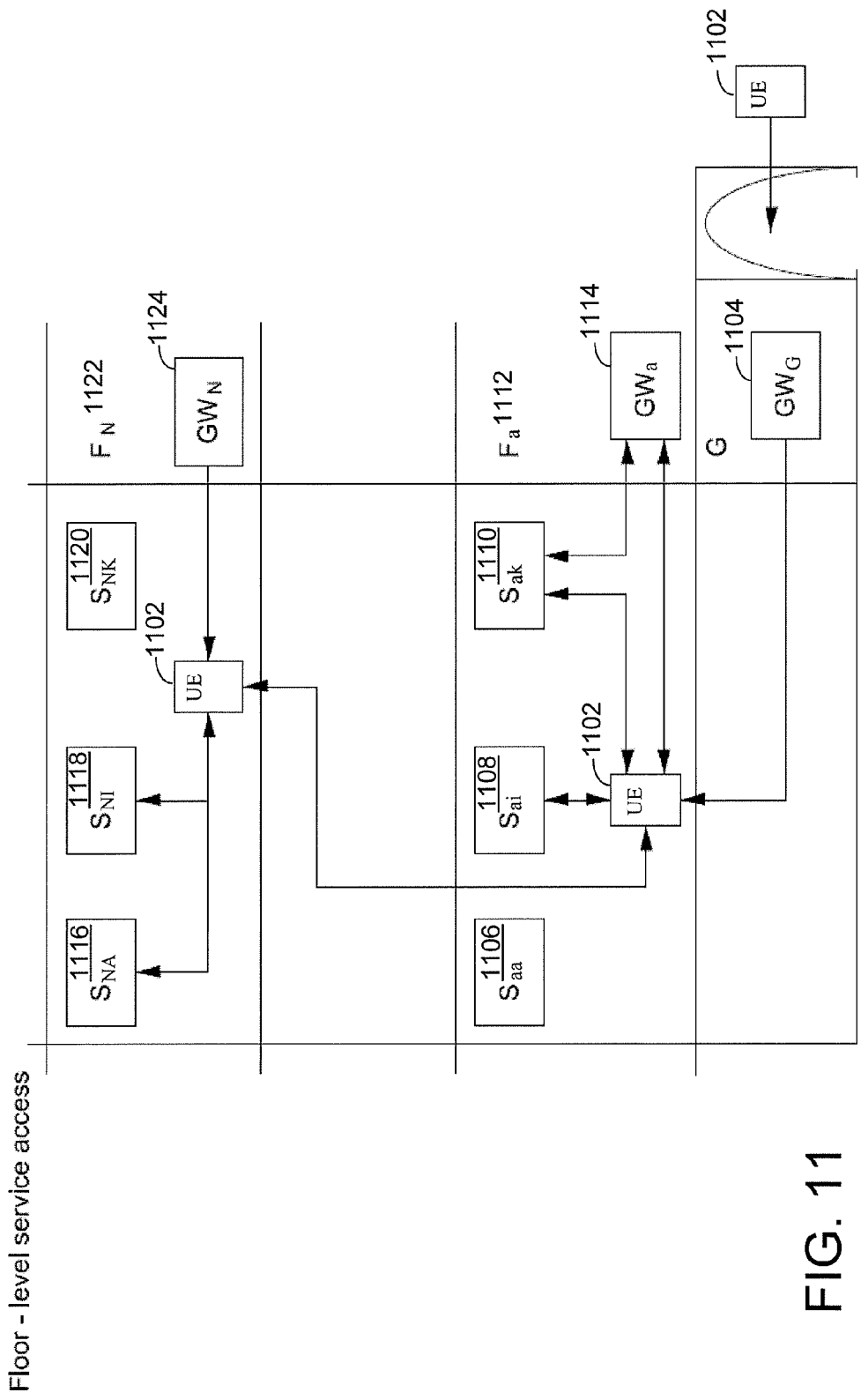
FIG. 11 is a diagram illustrating a floor-level service access for a user equipment (UE)

According to an example embodiment, a floor level service SSO may be used to enable a user and/or a user's UE to access services in a number of domains using a single identity. FIG. 11 is a diagram illustrating such a floor-level service access. For example, a mobile user may enter a building (e.g., an office building) with many floor levels, such as $F_a$ 1112 and $F_N$ 1122 for example. According to an example embodiment, each floor may be leased by multiple companies. The mobile user may own and/or use a mobile device, such as UE 1102 for example. UE 1102 may be a private mobile device (e.g., a smartphone or a laptop) and may contain a subscription to the user's company's remote and/or on-site electronic services S. The subscription may enable SSO to company services and/or may be realized using any available identity management scheme. According to one example, UE 1102 may bear a local OP instance of a local OpenID system run by the company and/or by an identity service provider (e.g., an MNO).

As shown in FIG. 11, when entering a building (e.g., office building) and moving inside of it, UE 1102 may interact (e.g., automatically) with one or more gateways, such as GW$_G$ 1104, GW$_a$ 1114, and/or GW$_N$ 1124 for example. Each of GW$_a$ 1114 and GW$_N$ 1124 may be associated with a group of services $S_a$ and $S_N$, respectively. For example, GW$_a$ 1114 may enable access to services $S_{aa}$ 1106, $S_{ai}$ 1108, and/or $S_{ak}$ 1110, while GW$_N$ 1124 may enable access to services $S_{NA}$ 1116, $S_{NI}$ 1118, and/or $S_{NK}$ 1120.

GW$_G$ 1104 may be encountered by UE 1102 when UE 1102 comes into close proximity to the building (e.g., at physical access to the building). GW$_G$ 1104 may be serving an access control function for other GWs and/or the services in the building. This gatekeeper GW$_G$ 1104 may identify and/or authenticate UE 1102, such as via an OpenID process for example. GW$_G$ 1104 may be able to identify and/or authenticate UE 1102 since GW$_G$ 1104 may know the identity providers of the companies in the building. According to one embodiment, GW$_G$ 1104 may have a trust relationship with the companies in the building. GW$_G$ 1104 may identify UE 1102, and/or serve as a building-wide identity provider for UE 1102. GW$_G$ 1104 may roll out credentials to UE 1102, provide service discovery data to UE 1102, and/or set up permission policies for UE 1102 for service access in the building.

While UE 1102 may pass through the various floor levels, such as $F_a$ 1112 and/or $F_N$ 1122 for example, UE 1102 may contact a gateway GW that corresponds to each floor F (or group of services). For example, when the UE 1102 is on floor $F_a$ 1112, it may contact gateway GW$_a$ 1114 for access to services $S_{aa}$ 1106, $S_{ai}$ 1108, and/or $S_{ak}$ 1110, while UE 1102 may contact gateway GW$_N$ 1124 when on floor $F_N$ 1122 to access services $S_{NA}$ 1116, $S_{NI}$ 1118, and/or $S_{NK}$ 1120. With each gateway, a similar enrollment procedure may be run as was run with GW$_G$ 1104. The enrollment procedure may be based on the trust relationship between the gateway (e.g., GW$_a$ 1114 or GW$_N$ 1124) and GW$_G$ 1104. In this way, UE 1102 and/or its user may acquire authentication credentials for each floor, and/or may access the services to which UE 1102 and/or its user subscribes. The authentication credentials and/or services may be differentiated by gateway-wise (e.g., floor-wise) policies. For example, on floor $F_a$ 1112, the UE 1102 may have access to emergency services, while on floor $F_N$ 1122 the UE 1102 may use online printing.

According to one example embodiment, the UE 1102 may have full service access to the services associated with a gateway. For example, floor $F_N$ 1122 may be the user's home floor, in which the UE 1102 may be granted access to a greater number of services, and/or full access to the services, via GW$_N$ 1124 than on another floor. One or more floors and/or gateways may be grouped, so that there may be a group-of-floors level of policy distinction and/or handling. This process may be automated. For example, floors $F_a$ 1112 and $F_N$ 1122 may be grouped and/or have associated policies such that the UE 1102 may not even notice the enrollment and/or log-in procedures on the floors. Each floor F in FIG. 11 represents a group of services, but it will be understood that services may be grouped in various other ways.

Local OpenID may provide a lightweight realization option for the embodiment illustrated in FIG. 11. For example, a principle of enrollment at first encounter may be followed with each gateway GW. Enrollment at first encounter may work by accessing one or more GWs as an ordinary RP or web service. The service discovery may be any suitable form of discovery for example. The UE 1102 may be unknown to one or more other GWs upon accessing the GWs upon first encounter. The authentication toward a GW may be effected via the next GW above in a hierarchy of OPs. According to an example embodiment, the topmost OP in the hierarchy may be the original subscription OP (e.g., the MNO). The gatekeeper GW, such as GW$_G$ 1104 for example, may follow at the level below the original subscription OP, and the floor or group GWs (e.g., GW$_a$ 1114 and/or GW$_N$ 1124) may follow at the next level.

Figure 12:
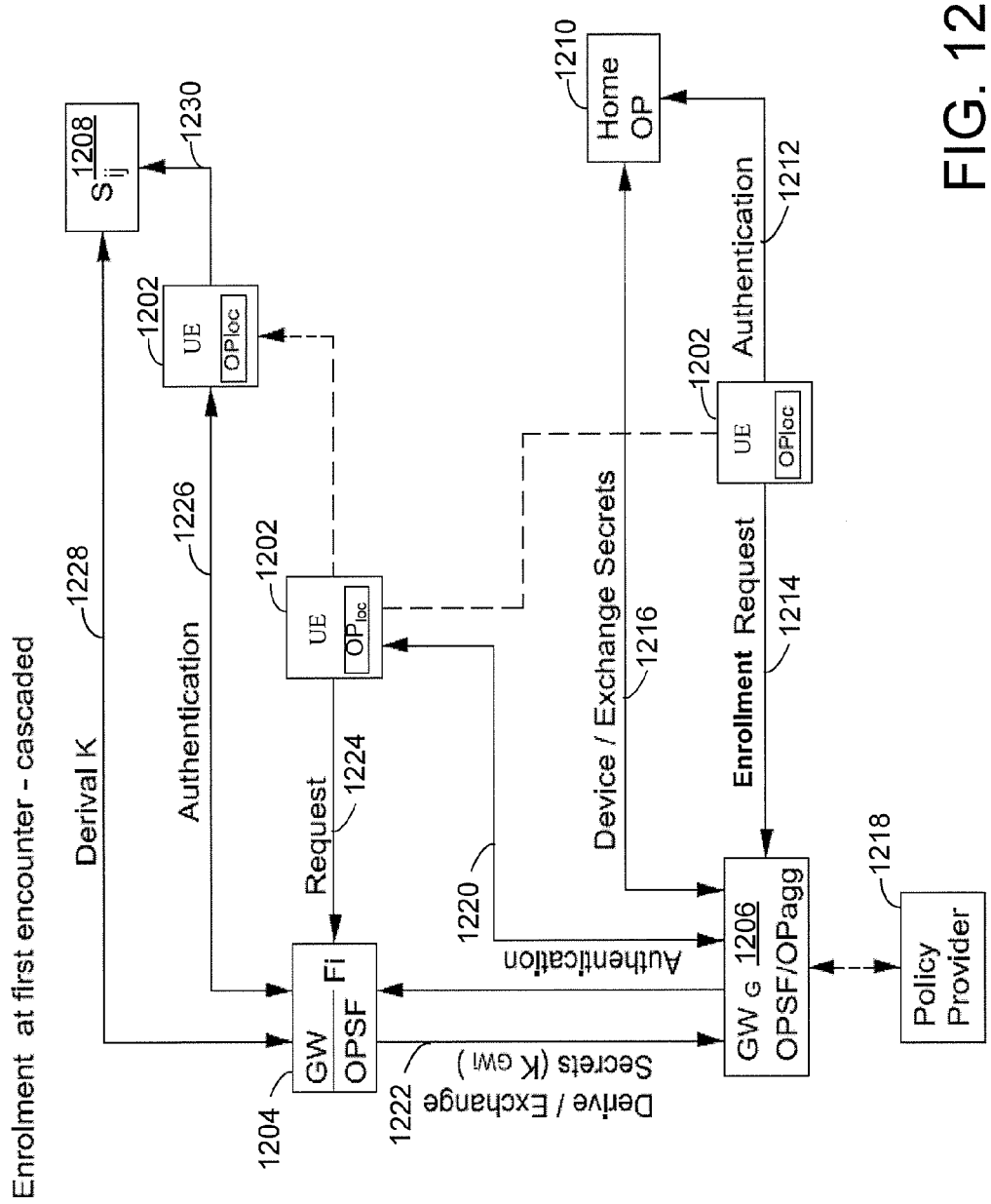
FIG. 12 is a diagram illustrating a floor-level service access for a UE using local OpenID.

FIG. 12 is a diagram illustrating a floor-level service access using local OpenID. The function of each gateway one may encounter, such as the first encounter for example, may be to operate subsidiary secrets (e.g., derived keys) in the authentication run with the superior OP. This chaining of OP enrollment is shown in FIG. 12. Gateway-based local OpenID federation protocols, as described herein, may be used. The high-level concept for consecutive gateway enrollment and/or gateway-layered service access may be enabled. Gateway enrollment and/or gateway-layered service access may be enabled using the procedures described herein, such as ENR$_G$ and/or AUTH$_G$ for example.

Enrollment procedures may be performed as illustrated in FIG. 12. As illustrated in FIG. 12, a UE 1202 may include an OP$_{loc}$ and may perform authentication with the home OP 1210 at 1212. The UE 1202 may submit an enrollment request to GW$_G$ 1206 at 1214. The GW$_G$ 1206 may derive and/or exchange secrets with the home OP 1210 at 1216 for enrolling the UE 1202 in the domain$^G$ (e.g., using the UE 1202 source domain$^S$ identifier as described herein). The $GW_G$ 1206 may also be in communication with a policy provider 1218 that may implement policies on user authentication and/or access to services. As the UE 1202 moves into proximity of the $GW_{Fi}$ 1204, the UE 1202 may request enrollment in domain$^i$ at 1224 for accessing services in domain$^i$, such as services $S_{ij}$ 1208 at 1230 for example. The UE 1202 may perform authentication with $GW_{Fi}$ 1204 at 1226 to access services in domain$^i$. $GW_{Fi}$ 1204 may derive and/or exchange secrets with the $GW_G$ 1206 at 1222. The UE 1202 may perform authentication with the $GW_G$ 1206 at 1220 to perform enrollment with $GW_{Fi}$ 1204. This may establish new secrets in the $OP_{loc}$ of the UE 1202 for use in domain$^i$. To obtain access to services in domain$^i$, such as service $S_{ij}$ 1208 for example, the UE 1202 may request access to service $S_{ij}$ 1208 at 1230 and authenticate with $GW_{Fi}$ 1204 and the $OP_{loc}$ function to obtain access to service $S_{ij}$ 1208. The RP of service $S_{ij}$ 1208 may perform key derivation with $GW_{Fi}$ 1204 at 1228.

According to an example embodiment, the user's UE 1202 may not be enrolled with the floor level gateway $GW_{Fi}$ 1204 or the gatekeeper $GW_G$ 1206. The user and/or UE 1202 may attempt to access the service $S_{ij}$ 1208 on floor $F_i$. $GW_{Fi}$ 1204 may intercept the service access attempt with the RP of $S_{ij}$ 1208, and may notice that the UE 1202 with $OID_S$ (e.g., source domain OpenID identifier) may not yet be enrolled. $GW_{Fi}$ 1204 may initiate $ENR_i$ the enrollment protocol with the domain$^i$ of $GW_{Fi}$ 1204. $GW_{Fi}$ 1204 may attempt to obtain (e.g., via HTTP-simple discovery) the $OP_{agg}$'s address at home OP 1210, such as in the first step of $ENR_i$ for example. $GW_G$ 1206 may intercept this communication attempt and/or determine an OpenID request to the source domain.

$GW_G$ 1206 may return a custom error message, such as a custom error message 'not operates' for example, to $GW_{Fi}$ 1204. The error message may include a redirect to $GW_G$ 1206's enrollment page. $GW_{Fi}$ 1204 may separate the error message, abort $ENR_i$ and/or forward the redirect to the BA of the UE 1202. This may be the first step of $ENR_G$ in domain$^G$ for example. BA may run $ENR_G$ with $GW_G$ 1206. The user of UE 1202 may repeat the service access attempt to $S_{ij}$ 1208, upon which $ENR_i$ may be initiated. After successful $ENR_i$ the user may access S, using $AUTH_i$. The cascade of enrollments may enable the user to authenticate with the RP providing services $S_{ij}$ 1208 using the home OP 1210. It will be understood that the user may not be required to repeat each service access attempt, but that this may be performed automatically to prevent the user from having to repeat such access attempts.

The sequence of enrollments with $GW_G$ 1206 and/or the floor gateway $GW_{Fi}$ 1204 may be combined with physical access control and/or biometric authentication. For example, at a user's entrance to a facility, the user may be directed to an enrollment counter. The user may be instructed to access the Web site of $GW_G$ 1206 for enrollment. The user may run $ENR_G$ with $GW_G$ 1206 which may deliver biometric authentication data to the access control system, which may be co-located with the gateway. Care may be taken to bind the biometric enrollment to the enrollment of the UE 1202, e.g., using $OP_{loc}$ residing thereon. For example, $ENR_G$ may be augmented by a challenge-response procedure. The biometric enrollment procedure may generate a secret number. The secret number may be transferred confidentially to $OP_{loc}$, and/or displayed to the user in the augmented $ENR_G$ protocol. The user may read out that secret number aloud, either to the personnel present at the enrollment counter, or by automated equipment for example. This may ensure that the user submitting his biometric data is in physical possession of the device and/or $OP_{loc}$ with which $GW_G$ 1206 runs $ENR_G$. This is a non-limiting example, as other methods may be used to ensure that the user submitting his biometric data is in physical possession the device and/or $OP_{loc}$.

The $ENR_G$ procedure may be coupled with a download of a convenience access link to the UE 1202. This may be used to initiate the later building access using local OpenID with combined biometric operations with some added convenience for the user. This convenience access link may come in various forms. For example, the convenience access link may include a browser bookmark pointing to a special service subsidiary to $GW_G$ 1206, which may run the combined authentication and/or physical access control procedure. Other forms of the convenience access link may include a Java Applet and/or a mobile application for mobile devices for example.

Access control for the facility/building may be established via a service of $GW_G$ 1206, which may be accessed by UE 1202 via a convenience access link, as described herein. In one example, the user may be directed to a turnstile/single-person-gate which may contain the biometric equipment for user authentication. The user may enter his/her biometric authentication to the equipment, and may access the access service via the convenience access link. The matching of the biometric data may occur within the access service (e.g., a relying party) which may combine the biometric date with the local OpenID authentication via $AUTH_G$, or it may be performed locally inside $OP_{loc}$. When $OP_{loc}$ is implemented, the biometric data may be transferred to $OP_{loc}$ in the course of enrollment and in the $AUTH_G$ protocol run.

Although features and elements are described above in particular combinations, one of ordinary skill in the art will appreciate that each feature or element can be used alone or in any combination with the other features and elements. Additionally, one of ordinary skill in the art will appreciate that the embodiments described herein are provided for exemplary purposes only. For example, while embodiments may be described herein using an $OP_{loc}$, a non-local OP or external OP may be used to perform similar functions, and vice versa. Furthermore, the embodiments described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A computer-implemented method for enabling authentication of a user of a user device via an identity of a user that has been authenticated for use in a source domain, the method comprising:

receiving the user's authenticated source domain identity at a target domain, wherein the user's authenticated source domain identity enables the user to access a source domain service at the source domain;

enrolling the user's authenticated source domain identity at the target domain, wherein the enrollment of the user's authenticated source domain identity enables the user to access a target domain service being provided at the target domain using the user's authenticated source domain identity; and authenticating, via an identity provider residing locally on the user device, the user for the access to the target domain service using the enrolled user's authenticated source domain identity, wherein authenticating the user for the access to the target domain service further comprises:

deriving a signing key based on a key that is shared with the identity provider; and sending the signing key to a service provider of the target domain service.

2. The method of claim 1, further comprising:

generating a local enrollment parameter for initiating the authentication via the identity provider on the user device;

sending the local enrollment parameter to the local identity provider to initiate the authentication via the identity provider; and receiving a signed assertion from the identity provider indicating the authentication of the user at the target domain.

3. The method of claim 2, further comprising:

establishing, at the target domain, a secure channel with the identity provider using a shared key, and wherein the signed assertion is received via the secure channel.

4. The method of claim 1, wherein enrolling the user's authenticated source domain identity further comprises sending a request for enrollment of the user's authenticated source domain identity to an identity provider aggregation entity.

5. The method of claim 1, wherein enrolling the user's authenticated source domain identity further comprises:

determining a target domain identity associated with the user based on the user's authenticated source domain identity; and storing an association of the target domain identity and the user's authenticated source domain identity for enabling the authentication of the user at the target domain.

6. The method of claim 1, wherein the method is performed by a gateway residing at the target domain or an identity provider server residing at the target domain.

7. The method of claim 6, wherein the gateway is one of a plurality of gateways used to control access to the target domain service.

8. The method of claim 1, wherein enabling the authentication of the user for the access to the target domain service further comprises:

rewriting the user's authenticated source domain identity as the target domain identity; and sending the target domain identifier to a service provider of the target domain service.

9. The method of claim 1, wherein the target domain service is included in a group of services in the target domain that are accessible using the user's authenticated source domain identifier.

10. The method of claim 1, wherein the user's authenticated source domain identity is received from the user via an enrollment service at the target domain, and wherein the enrollment service sends the user's authenticated source domain identity to an identity provider aggregation entity.

11. The method of claim 1, wherein the source domain is controlled by an identity provider server that is external to the user device.

12. The method of claim 1, wherein enrolling the user's authenticated source domain identity at the target domain further comprises sending information to the identity provider via a secondary channel, and wherein the secondary channel is different from a channel on which the authentication is performed.

13. A method for enabling the use of a user's identity which has been authenticated by an identity provider for use in a source domain for obtaining access to a service at a target domain, the method comprising, at a user device:

sending the user's authenticated source domain identity to the target domain to obtain access to the service at the target domain, wherein the user's authenticated source domain identity enables the user to access a source domain service at the source domain;

receiving a request for an authentication of the user to enable an enrollment of the user's authenticated source domain identity at the target domain;

performing, via a local identity provider implemented locally on the user device, the authentication of the user;

establishing a secure channel with an enrollment entity at the target domain, wherein the enrollment entity is configured to enable the enrollment of the user's authenticated source domain identity at the target domain; and sending, via the secure channel, the authentication of the user to the enrollment entity, wherein the enrollment entity comprises a gateway or an identity provider server, and the local identity provider comprises a local OpenID provider.

14. The method of claim 13, further comprising:

receiving a request for a second authentication of the user to authenticate the user at the target domain;

performing, via the local identity provider, the second authentication of the user;

establishing a secure channel with a service provider configured to provide the service at the target domain; and sending, via the secure channel with the service provider, the second authentication of the user to enable access to the services.

15. The method of claim 14, wherein the secure channel with the service provider is established based on a key shared between the local identity provider and the service provider.

16. The method of claim 15, wherein the secure channel with the enrollment entity is established based on a key shared between the local identity provider and the service provider.

17. The method of claim 13, further comprising:

receiving a redirect message comprising an address to an authentication entity at the source domain for obtaining the authentication of the user; and determining the address of the local identity provider based on the address of the authentication entity at the source domain.

18. The method of claim 13, wherein the authentication of the user is performed via a communication between the local identity provider and a local authentication agent.

19. A computer-implemented method for enabling authentication of a user of a user device via an identity of a user that has been authenticated for use in a source domain, the method comprising:

receiving the user's authenticated source domain identity at a target domain, wherein the user's authenticated source domain identity enables the user to access a source domain service at the source domain;

enrolling the user's authenticated source domain identity at the target domain, wherein the enrollment of the user's authenticated source domain identity enables the user to access a target domain service being provided at the target domain using the user's authenticated source domain identity;

authenticating, via an identity provider residing locally on the user device, the user for the access to the target domain service using the enrolled user's authenticated source domain identity;

generating a local enrollment parameter for initiating the authentication via the identity provider on the user device;

sending the local enrollment parameter to the local identity provider to initiate the authentication via the local identity provider; and receiving a signed assertion from the identity provider indicating the authentication of the user at the target domain.

* * * * *